United States Patent
Chiang et al.

(10) Patent No.: US 12,158,634 B2
(45) Date of Patent: Dec. 3, 2024

(54) OPTICAL LENS, CAMERA MODULE, AND TERMINAL

(71) Applicant: HUAWEI TECHNOLOGIES CO., LTD., Guangdong (CN)

(72) Inventors: Yita Chiang, Dongguan (CN); Yuanlin Jia, Shenzhen (CN); Rongkai Feng, Shenzhen (CN); Yasuhide Nihei, Tokyo (JP)

(73) Assignee: Huawei Technologies Co., Ltd., Shenzhen (CN)

( * ) Notice: Subject to any disclaimer, the term of this patent is extended or adjusted under 35 U.S.C. 154(b) by 169 days.

(21) Appl. No.: 17/670,212

(22) Filed: Feb. 11, 2022

(65) Prior Publication Data

US 2022/0163764 A1    May 26, 2022

Related U.S. Application Data

(63) Continuation of application No. PCT/CN2020/104976, filed on Jul. 27, 2020.

(30) Foreign Application Priority Data

Aug. 12, 2019    (CN) .......................... 201910747428.5

(51) Int. Cl.
    *G02B 9/34*      (2006.01)
    *G02B 13/18*      (2006.01)
    (Continued)

(52) U.S. Cl.
     CPC .............. *G02B 9/34* (2013.01); *G02B 13/18* (2013.01); *H04N 23/55* (2023.01); *H04N 23/80* (2023.01)

(58) Field of Classification Search
     CPC ...... G02B 13/0045; G02B 13/18; G02B 9/34; H04N 23/55; H04N 23/80
     See application file for complete search history.

(56) References Cited

U.S. PATENT DOCUMENTS

| | | | |
|---|---|---|---|
| 7,535,660 B2 * | 5/2009 | Saito | G02B 13/003 359/691 |
| 2010/0165483 A1 * | 7/2010 | Tang | G02B 13/22 359/715 |
| 2020/0096734 A1 * | 3/2020 | Hsueh | G02B 13/0045 |

FOREIGN PATENT DOCUMENTS

| | | |
|---|---|---|
| CN | 101813819 A | 8/2010 |
| CN | 104330869 A | 2/2015 |

(Continued)

OTHER PUBLICATIONS

Office Action issued in Chinese Application No. 201910747428.5 on Jun. 8, 2021, 14 pages (with English translation).

(Continued)

*Primary Examiner* — Antoinette T Spinks
(74) *Attorney, Agent, or Firm* — Fish & Richardson P.C.

(57) ABSTRACT

This application provides an optical lens, a camera module, and a terminal. The optical lens includes a first lens element, a second lens element, a third lens element, a fourth lens element, a fifth lens element, and a sixth lens element in sequence from an object side to an image side; and each lens element of the optical lens satisfies the following relations: $0.2 \leq BFL/TTL \leq 0.6$, and $0.2 \leq TTL1/MIC \leq 0.5$. Therefore, the optical lens has an improved back focal length BFL and a small total on-axis thickness TTL1 of the plurality of lens elements while achieving high imaging performance. Further, a thickness of the terminal can also be reduced.

18 Claims, 18 Drawing Sheets

(51) Int. Cl.
*H04N 23/55* (2023.01)
*H04N 23/80* (2023.01)

(56) References Cited

FOREIGN PATENT DOCUMENTS

| | | | | |
|---|---|---|---|---|
| CN | 105988185 A | 10/2016 | | |
| CN | 107861218 A | * 3/2018 | ......... | G02B 13/0045 |
| CN | 111239968 A | 6/2020 | | |
| CN | 211577545 U | 9/2020 | | |
| JP | H0627370 A | 2/1994 | | |
| JP | 3348899 B2 | 11/2002 | | |

OTHER PUBLICATIONS

PCT International Search Report and Written Opinion issued in International Application No. PCT/CN2020/104976 on Nov. 2, 2020, 19 pages (with English translation).

\* cited by examiner

OPTICAL LENS, CAMERA MODULE, AND TERMINAL

CROSS-REFERENCE TO RELATED APPLICATIONS

This application is a continuation of International Application No. PCT/CN2020/104976, filed on Jul. 27, 2020, which claims priority to Chinese Patent Application No. 201910747428.5, filed on Aug. 12, 2019. The disclosures of the aforementioned applications are hereby incorporated by reference in their entireties.

TECHNICAL FIELD

Embodiments of this application relate to the lens field, and specifically, to an optical lens, a camera module, and a terminal.

BACKGROUND

Currently, mobile phones are becoming thinner. However, to achieve better imaging quality, more lens elements are used in lenses of existing mobile phones. As a result, the lenses of the mobile phones gradually become thicker. A thickness of a lens of a mobile phone is always a main factor that restricts development of the mobile phone toward thinness. Therefore, how to reduce a thickness of an optical lens and hence reduce a thickness of a mobile phone while achieving a good imaging effect has become a hot issue of research.

SUMMARY

Embodiments of this application provide an optical lens, a camera module including the optical lens, and a terminal including the camera module, to obtain a thin optical lens, a thin camera module, and a thin terminal while achieving a good imaging effect.

According to a first aspect, an optical lens is provided. The optical lens includes a plurality of lens elements arranged from an object side to an image side, where each lens element includes an object-side surface facing the object side and an image-side surface facing the image side, and the optical lens satisfies the following relations:

$$0.2 \leq BFL/TTL \leq 0.6, \text{ and}$$

$$0.2 \leq TTL1/MIC \leq 0.5,$$

where BFL is a back focal length of the optical lens, TTL is a total track length of the optical lens, TTL1 is a total on-axis thickness of the plurality of lens elements, the total on-axis thickness of the plurality of lens elements is a distance from an intersection point between an axis of the optical lens and an object-side surface of a first lens element to an intersection point between the axis of the optical lens and an image-side surface of a last lens element, and MIC is a maximum image circle of the optical lens.

It should be noted that in this embodiment of this application, using a lens element as a boundary, one side on which a photographed object is located is an object side, and a surface of the lens element facing the object side may be referred to as an object-side surface; and using the lens element as a boundary, one side on which an image of the photographed object is located is an image side, and a surface of the lens element facing the image side may be referred to as an image-side surface.

In this embodiment of this application, when the back focal length (Back Focal Length, BFL) of the optical lens, the total track length (Total Track Length, TTL), the total on-axis thickness (Total Track Length 1, TTL1) of the plurality of lens elements, and the maximum image circle diameter (Maximum Image Circle, MIC) of the optical lens satisfy the foregoing relations, the optical lens can have a great back focal length (BFL) and a small total on-axis thickness (TTL1) of the plurality of lens elements while achieving high imaging performance. Specifically, a ratio of a BFL to a TTL of an ordinary optical lens is less than 0.07, far less than a ratio of the TTL1 to the MIC in this embodiment of this application; and a ratio of a TTL1 to an MIC of an ordinary optical lens is generally greater than 0.6, far greater than the ratio of the BFL to the TTL in this embodiment of this application. However, when a specification of the optical lens is fixed, the TTL and the MIC are basically unchanged. Therefore, in this application, the back focal length BFL of the optical lens is great, and the thickness TTL1 of the plurality of lens elements of the optical lens is small. Generally, the thickness of the optical lens is determined by thicknesses of the lens elements in the optical lens. Therefore, the thickness of the optical lens in this application can be small. In addition, in this embodiment of this application, because the back focal length BFL is great, the optical lens can have a large aperture and achieve a good imaging effect.

In some embodiments, the plurality of lens elements arranged from the object side to the image side include the first lens element, a second lens element, a third lens element, a fourth lens element, and a fifth lens element that are arranged in sequence.

In some embodiments, the following relations are satisfied between the first lens element and the second lens element, and between the first lens element and the fifth lens element:

$$20 \leq v1 - v2 \leq 60, \text{ and}$$

$$-16 \leq v1 - v5 \leq 60,$$

where v1 is an Abbe number of the first lens element, v2 is an Abbe number of the second lens element, and v5 is an Abbe number of the fifth lens element.

In this embodiment of this application, a range of a difference between Abbe numbers of the first lens element and the second lens element and a range of a difference between Abbe numbers of the first lens element and the fifth lens element are specified, and the lens elements having different Abbe numbers cooperate with each other to help reduce system dispersion, so that the thickness of the optical lens is reduced as much as possible while the optical lens can have a good imaging effect.

In some embodiments of this application, the back focal length of the optical lens satisfies 2.55 mm≤BFL≤4.17 mm. In comparison with an ordinary optical lens whose back focal length BFL is less than 1 mm, the back focal length is greatly increased. When the specification of the optical lens is fixed, if the back focal length is increased, the total on-axis thickness TTL1 of the plurality of lens elements of the optical lens is reduced, so that the thickness of the optical lens is reduced.

In some embodiments of this application, the first lens element has positive refractive power, the object-side surface of the first lens element near the axis is convex, a part of an image-side surface of the first lens element near the axis is convex or concave, and the first lens element satisfies the following relations:

$$0.5 \le f_1/f \le 0.8, \text{ and}$$

$$-0.024 \le R_1/R_2 < 0 \text{ or } 0 < R_1/R_2 \le 0.404,$$

where $f_1$ is a focal length of the first lens element, f is a focal length of the optical lens, $R_1$ is a curvature radius of the object-side surface of the first lens element, and $R_2$ is a curvature radius of the image-side surface of the first lens element.

It should also be noted that a positive/negative curvature radius indicates that an optical surface is convex toward the object side or convex toward the image side. When the optical surface (including an object-side surface or an image-side surface) is convex toward the object side, the curvature radius of the optical surface is a positive value; or when the optical surface (including an object-side surface or an image-side surface) is convex to the image side, which means that the optical surface is concave toward the object side, the curvature radius of the optical surface is a negative value.

In this embodiment of this application, R indicates a curvature radius of a part of the optical surface near the axis. A part near the axis (also referred to as a part near an optical axis) is a part infinitely near the optical axis.

In some embodiments of this application, a range of a ratio of the focal length of the first lens element to the focal length of the optical lens is specified and indicates a light concentration capability of the first lens element, to help reduce system spherical aberration. In addition, a range of a ratio of the curvature radius of the object-side surface of the first lens element to the curvature radius of the image-side surface of the first lens element is specified and indicates convexity or concavity of the image-side surface and the object-side surface of the first lens element, to help reduce the total on-axis thickness TTL1 of the plurality of lens elements of the optical lens and increase the back focal length BFL of the optical lens, so that the thickness of the optical lens is reduced as much as possible while the optical lens can have a good imaging effect.

In some embodiments, the first lens element satisfies the following relation: 0.2≤d1/Σd≤0.3, where d1 is an on-axis thickness of the first lens element, and Σd is a sum of on-axis thicknesses of all the lens elements. The on-axis thickness of the lens element is a distance from an intersection point between the optical axis and the object-side surface of the lens element to an intersection point between the optical axis and the image-side surface of the lens element.

The foregoing relation is used to control a ratio of the on-axis thickness of the first lens element to the sum of the on-axis thicknesses of the plurality of lens elements in the optical lens, so that an appropriate lens element thickness can be ensured.

In some embodiments, the second lens element has negative refractive power, an object-side surface of the second lens element near the axis is convex, an image-side surface of the second lens element near the axis is concave, and the following relations are satisfied:

$$-2.1 \le f_2/f \le -1.0, \text{ and}$$

$$1 \le R_3/R_4 \le 24,$$

where $f_2$ is a focal length of the second lens element, f is the focal length of the optical lens, $R_3$ is a curvature radius of the object-side surface of the second lens element, and $R_4$ is a curvature radius of the image-side surface of the second lens element.

In some embodiments of this application, a range of a ratio of the focal length of the second lens element to the focal length of the optical lens is specified and indicates a light concentration capability of the second lens element, to help reduce system spherical aberration. In addition, a range of a ratio of the curvature radius of the object-side surface of the second lens element to the curvature radius of the image-side surface of the second lens element is specified and indicates convexity or concavity of the image-side surface and the object-side surface of the second lens element, to help reduce the total on-axis thickness TTL1 of the plurality of lens elements of the optical lens and increase the back focal length BFL of the optical lens, so that the thickness of the optical lens is reduced as much as possible while the optical lens can have a good imaging effect.

In some embodiments, the second lens element satisfies the following relation: 0.06≤d2/Σd≤0.09, where d2 is an on-axis thickness of the second lens element, and Σd is the sum of the on-axis thicknesses of all the lens elements.

The foregoing relation is used to control a ratio of the on-axis thickness of the second lens element to the sum of the on-axis thicknesses of the plurality of lens elements in the optical lens, so that an appropriate lens element thickness can be ensured.

In some embodiments, the third lens element has positive refractive power or negative refractive power, positions of an object-side surface and an image-side surface of the third lens element near the axis are both convex or concave, and the following relations are satisfied:

$$-80 \le f_3/f \le 1.2, \text{ and}$$

$$0.6 \le R_5/R_6 \le 3.6,$$

where $f_3$ is a focal length of the third lens element, f is the focal length of the optical lens, $R_5$ is a curvature radius of the object-side surface of the third lens element, and $R_6$ is a curvature radius of the image-side surface of the third lens element.

In some embodiments of this application, a range of a ratio of the focal length of the third lens element to the focal length of the optical lens is specified and indicates a light concentration capability of the third lens element, to help reduce system spherical aberration. In addition, a range of a ratio of the curvature radius of the object-side surface of the third lens element to the curvature radius of the image-side surface of the third lens element is specified and indicates convexity or concavity of the image-side surface and the object-side surface of the third lens element, to help reduce the total on-axis thickness TTL1 of the plurality of lens elements of the optical lens and increase the back focal length BFL of the optical lens, so that the thickness of the optical lens is reduced as much as possible while the optical lens can have a good imaging effect.

In some embodiments, the third lens element satisfies the following relation:

$$0.05 \le d3 \Big/ \sum d \le 0.2,$$

where d3 is an on-axis thickness of the third lens element, and Σd is the sum of the on-axis thicknesses of all the lens elements.

The foregoing relation is used to control a ratio of the on-axis thickness of the third lens element to the sum of the on-axis thicknesses of the plurality of lens elements in the optical lens, so that an appropriate lens element thickness can be ensured.

In some embodiments, the lens element closest to the image side (that is, farthest away from the first lens element) has positive refractive power or negative refractive power, an object-side surface of the lens element near the axis is convex or concave, an image-side surface of the lens element near the axis is concave, and the lens element closest to the image side satisfies the following relations:

$$-1 \le f_n/f \le 4, \text{ and}$$

$$0.82 \le R_{2n-1}/R_{2n} \le 3.29,$$

where the plurality of lens elements are n lens elements, n being a natural number greater than or equal to 6, $f_n$ is a focal length of the lens element closest to the image side, f is the focal length of the optical lens, $R_{2n-1}$ is a curvature radius of the object-side surface of the lens element closest to the image side, and $R_{2n}$ is a curvature radius of the image-side surface of the lens element closest to the image side.

It should be noted that in this embodiment of this application, when the plurality of lens elements in the optical lens are five lens elements, the lens element closest to the image side is the fifth lens element; or when the plurality of lens elements in the optical lens are six lens elements, the lens element closest to the image side is a sixth lens element.

In some embodiments of this application, a range of a ratio of the focal length of the lens element closest to the image side to the focal length of the optical lens is specified and indicates a light concentration capability of the lens element closest to the image side, to help reduce system spherical aberration. In addition, a range of a ratio of the curvature radius of the object-side surface of the lens element closest to the image side to the curvature radius of the image-side surface of the lens element closest to the image side is specified and indicates convexity or concavity of the image-side surface and the object-side surface of the lens element closest to the image side, to help reduce the total on-axis thickness TTL1 of the plurality of lens elements of the optical lens and increase the back focal length BFL of the optical lens, so that the thickness of the optical lens is reduced as much as possible while the optical lens can have a good imaging effect.

In some embodiments, the lens element closest to the image side satisfies the following relation: 0.2≤dn/Σd≤0.3, where dn is an on-axis thickness of the lens element closest to the image side, and Σd is the sum of the on-axis thicknesses of all the lens elements.

The foregoing relation is used to control a ratio of the on-axis thickness of the lens element closest to the image side to the sum of the on-axis thicknesses of the plurality of lens elements in the optical lens, so that an appropriate lens element thickness can be ensured.

In some embodiments, a refractive index n1 of the first lens element satisfies the following relation: 1.50≤n1≤1.90.

The foregoing relation specifies the refractive index of the first lens element. The refractive index of the first lens element can be selected within a wide range. Therefore, a thin lens element with good performance is obtained more easily. This also helps reduce the total on-axis thickness of the plurality of lens elements of the optical lens.

In this application, each of the plurality of lens elements is made of a glass material, or a plastic material, or another composite material. Lens elements made of different materials have different ranges of Abbe numbers and different ranges of refractive indices. Lens elements made of appropriate materials are selected, and an optical lens having better imaging quality can be obtained through cooperation of such lens elements. In addition, the total on-axis thickness of the plurality of lens elements of the optical lens is reduced as much as possible.

In some embodiments of this application, the first lens element is made of a glass material. Because a lens element closer to the object side undertakes heavier optical path adjustment work, the lens element closer to the object side is more important for adjusting an optical effect. Because the first lens element is made of the glass material, and the glass lens element has a wide refractive index range, the refractive index of the first lens element can be selected within a wide range. Therefore, a thin lens element with good performance is obtained more easily. This also helps reduce the total on-axis thickness of the plurality of lens elements of the optical lens.

In some embodiments, at least one of the plurality of lens elements includes a plurality of sub lens elements that fit into each other, and at least two of the plurality of sub lens elements are made of different materials. "At least one" means one or more than one. "A plurality of sub lens elements" may be two or more than two sub lens elements.

Because sub lens elements made of different materials fit into each other to form one lens element, an Abbe number and a refractive index of the lens element are adjusted. This is equivalent to further expanding a refractive index range and an Abbe number range of the lens element. Therefore, a thin lens element with good performance is obtained more easily.

In some embodiments of this application, the image-side surface and the object-side surface of each of the plurality of lens elements satisfy the following formula:

$$x = \frac{cr^2}{1+\sqrt{1-Kc^2r^2}} + u^4 \sum_{m=0}^{M} a_m Q_m^{con}(u^2)$$

where for the image-side surface of each lens element, x is a sagitta of the image-side surface, r is a radial coordinate of the image-side surface, c is a spherical curvature of a vertex of the image-side surface, $a_m$ is a coefficient of the image-side surface, and $u=r/r_{max}$, where $r_{max}$ is a maximum value of a radial radius coordinate; or for the object-side surface of each lens element, x is a sagitta of the object-side surface, r is a radial coordinate of the object-side surface, c is a spherical curvature of a vertex of the object-side surface, $a_m$ is a coefficient of the object-side surface, and $u=r/r_{max}$, where $r_{max}$ is a maximum value of a radial radius coordinate; and K is a quadratic surface constant.

In some embodiments of this application, the image-side surface and the object-side surface of each of the plurality of lens elements are both aspherical, and the image-side surface and the object-side surface of each lens element satisfy the following formula:

$$x = \frac{cr^2}{1 + \sqrt{1 - Kc^2r^2}} + u^4 \sum_{m=0}^{M} a_m Q_m^{con}(u^2)$$

where x is an aspherical sagitta, r is an aspherical radial coordinate, c is a spherical curvature of an aspherical vertex, K is a quadratic surface constant, $a_m$ is an aspherical coefficient, and $u=r/r_{max}$, where $r_{max}$ is a maximum value of a radial radius coordinate.

In some embodiments of this application, the image-side surface and the object-side surface of each of the plurality of lens elements satisfy the following formula:

$$y = \frac{cr^2}{1 + \sqrt{1 - (1+K)c^2r^2}} + \sum_{i=1}^{N} a_i \rho^i$$

where for the image-side surface of each lens element, y is a sagitta of the image-side surface, r is a radial coordinate of the image-side surface, c is a spherical curvature of a vertex of the image-side surface, K is a quadratic surface constant, $a_i$ is a coefficient of the image side surface, and $\rho$ is a normalized axial coordinate; or for the object-side surface of each lens element, y is a sagitta of the object-side surface, r is a radial coordinate of the object-side surface, c is a spherical curvature of a vertex of the object-side surface, K is a quadratic surface constant, $a_i$ is a coefficient of the image side surface, and $\rho$ is a normalized axial coordinate.

In other embodiments of this application, the image-side surface and the object-side surface of each of the plurality of lens elements are both aspherical, and the image-side surface and the object-side surface of each lens element satisfy the following formula:

$$y = \frac{cr^2}{1 + \sqrt{1 - (1+K)c^2r^2}} + \sum_{i=1}^{N} a_i \rho^i$$

where y is an aspherical sagitta, r is an aspherical radial coordinate, c is a spherical curvature of an aspherical vertex, K is a quadratic surface constant, $a_i$ is an aspherical coefficient, and $\rho$ is a normalized axial coordinate.

According to a second aspect, this application further provides a camera module. The camera module includes a photosensitive element, a driving portion, and the optical lens, where the photosensitive element is located on the image side of the optical lens, and the driving portion drives the optical lens to move close to or away from the photosensitive element.

The camera module in this application includes the optical lens and the photosensitive element, and the optical lens is enabled to move close to or away from the photosensitive element. When the camera module works, the optical lens can be moved away from the photosensitive element, so that the photosensitive element is located on a focal plane of the optical lens and that photographing can be performed. When the camera module does not work, the optical lens is moved, and lens elements in the optical lens are moved close to the photosensitive element, that is, at least a part of the plurality of lens elements are located in a back focal position at which the optical lens works. In this case, a thickness of the camera module may be approximately a thickness of the optical lens plus the photosensitive element, that is, approximately a thickness (TTL1) of a lens element group formed by the plurality of lens elements. Because the thickness of the optical lens in this application is small, the thickness of the camera module is small. In addition, in this embodiment of this application, because the optical lens can have a large aperture, a good imaging effect is achieved, that is, the camera module can present a better imaging effect.

According to a third aspect, this application provides a terminal. The terminal includes an image processor and the camera module, where the image processor is communicatively connected to the camera module, the camera module is configured to obtain image data and input the image data to the image processor, and the image processor is configured to process the image data input to the image processor.

When the camera module is applied to the terminal and the camera module does not work, the optical lens can be moved, and lens elements in the optical lens are moved close to the photosensitive element, that is, at least a part of the plurality of lens elements are located in a back focal position at which the optical lens works. In this case, a thickness of the terminal may be approximately a thickness of the optical lens plus the photosensitive element. Because the thickness of the optical lens in this application is small, the thickness of the terminal can be small. In addition, because the camera module in this embodiment of this application can achieve a good imaging effect, imaging quality of the terminal is improved, and practical application value is higher.

DESCRIPTION OF EMBODIMENTS

Figure 1:
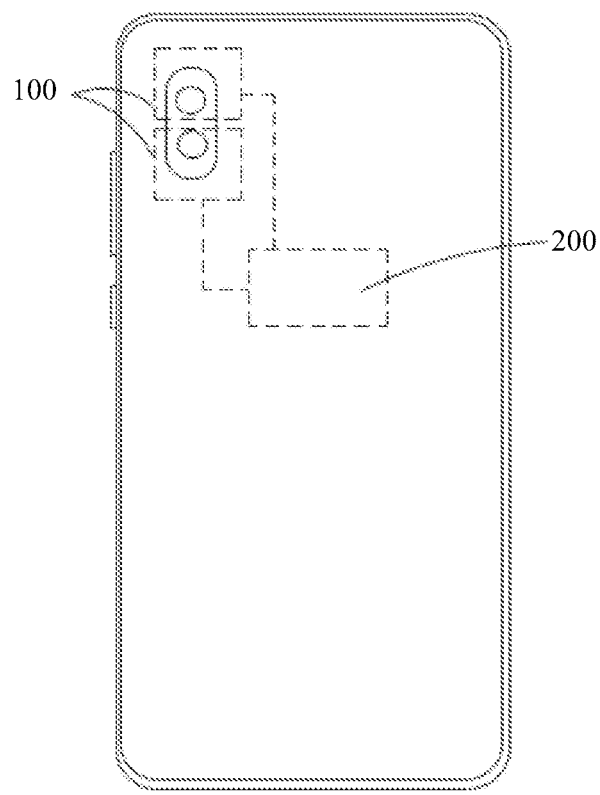
FIG. 1 is a schematic structural diagram of a terminal.

The following describes technical solutions of embodiments in this application with reference to accompanying drawings.

For ease of understanding, the following first explains and describes technical terms used in this application.

A focal length (focal length), is a measure of concentration or divergence of light in an optical system. It is a vertical distance from an optical center of a lens element or a lens element group to a focal plane when an object at infinity is formed into a clear image on the focal plane by using the lens element or the lens element group. From a practical perspective, it may be understood as a distance from a center of a lens to the focal plane. A position of an optical center of a fixed focus lens is fixed, but for a zoom lens, a change of an optical center of the lens brings about a change of a focal length of the lens.

An aperture is an apparatus configured to control an amount of light passing through a lens and entering a photosensitive surface in a body of a camera. It is usually inside the lens. A F/value is used to represent an aperture size.

A F value is a relative value (reciprocal of a relative aperture) derived from the focal length of the lens divided by a lens diameter. If the aperture F value is smaller, more light enters in a unit time. If the aperture F value is larger, a depth of field is smaller, and background content of a photo is blurred. This is similar to an effect of a telephoto lens.

A back focal length (Back Focal Length, BFL) is a distance from a last lens element of the lens to the focal plane.

Positive refractive power, which may also be referred to as positive refracting power, means that a lens element has a positive focal length and has a light concentration effect.

Negative refractive power, which may also be referred to as negative refracting power, means that a lens element has a negative focal length and has a light divergence effect.

A total track length (total track length, TTL) is a total length from one end of an optical lens away from an image plane to the image plane, and is a main factor forming a height of the camera.

A focal ratio F# is the focal length divided by the aperture size. From this value, an amount of light entering the optical system can be known.

An Abbe number, that is, a dispersion coefficient, is a ratio of variations of refractive indices of an optical material at different wavelengths, and represents a degree of dispersion of the material.

Field of view (field of view, FOV): In an optical instrument, using a lens of the optical instrument as a vertex, an included angle formed by two edges of a maximum range of an object that can be measured through the lens is referred to as the field of view. A size of the field of view determines a range of vision of the optical instrument. The larger the field of view, the broader the vision, and the smaller the optical magnification.

An optical axis is a line along which light passes through a center of an ideal lens perpendicularly. When light parallel to an optical axis enters a convex lens, an ideal convex lens should concentrate all light at a point behind the lens. The point at which all the light is concentrated is a focal point.

Object space: Using a lens element as a boundary, space in which a photographed object is located is object space.

Image space: Using the lens element as a boundary, space that accommodates an image formed behind the lens element after light emitted by the photographed object passes through the lens element is image space.

Using the lens element as a boundary, one side on which the photographed object is located is an object side, and a surface of the lens element close to the object side may be referred to as an object-side surface; and using the lens element as a boundary, one side on which the image of the photographed object is located is an image side, and a surface of the lens element close to the image side may be referred to as an image-side surface.

Axial chromatic aberration is also known as longitudinal chromatic aberration, or positional chromatic aberration, or axial aberration. A beam of light parallel to the optical axis, after passing through the lens, converges at different positions before and after on the optical axis. This aberration is referred to as positional chromatic aberration or axial chromatic aberration. This is because positions for imaging light of various wavelengths by the lens are different. As a result, focal planes for images of light of different colors cannot overlap during final imaging, and polychromatic light is scattered to form dispersion.

Lateral chromatic aberration is also referred to as chromatic aberration of magnification. A difference in magnification of light of different colors by the optical system is referred to as chromatic aberration of magnification. A wavelength causes the magnification of the optical system to change, and a size of an image changes accordingly.

Distortion (distortion), is a degree of distortion of an image formed by the optical system for an object relative to the object itself. Due to adverse impact of stop spherical aberration, a height at which chief rays of different fields of view intersect with a Gaussian image plane after passing through the optical system is not equal to an ideal image height, and a difference between the two is distortion. Therefore, the distortion changes only an imaging position of an off-axis object point on the ideal plane, causing distortion of an image shape, without affecting image definition.

Optical distortion (optical distortion) is a degree of distortion obtained through calculation in optical theory.

A diffraction limit (diffraction limit) means that when an ideal object point is imaged by the optical system, it is impossible to obtain an ideal image point due to a diffraction limitation, but a Fraunhofer diffraction image is obtained. Because an aperture of an ordinary optical system is circular, the Fraunhofer diffraction image is an airy disc. Therefore, an image of every object point is a diffuse spot, and it is difficult to distinguish between two diffuse spots when the two diffuse spots are close. This limits a resolution of the system. If the spot is larger, the resolution is lower.

A total on-axis thickness of a plurality of lens elements (TTL1) is a distance from an intersection point between an axis of the optical lens and an object-side surface of a first lens element to an intersection point between the axis of the optical lens and an image-side surface of a last lens element.

This application provides a terminal. The terminal may be a mobile phone, a smartphone, a tablet computer, a laptop, a camcorder, a video recorder, a camera, or a device in another form that has a photographing or video recording function. FIG. 1 is a schematic rear view of a terminal 1000 according to an embodiment of this application. In this embodiment, the terminal 1000 is a mobile phone. In this embodiment of this application, a mobile phone is used as an example of the terminal 1000 for description.

The terminal 1000 includes a camera module 100 and an image processor 200 communicatively connected to the camera module 100. The camera module 100 is configured to obtain image data and input the image data to the image processor 200, so that the image processor 200 processes the image data. The communications connection between the camera module 100 and the image processor 200 may include an electrical connection such as a cable connection for performing data transmission, or may include a coupling or the like for implementing data transmission. It may be understood that the communications connection between the camera module 100 and the image processor 200 may be further implemented in other manners that can implement data transmission.

A function of the image processor 200 is to perform optimization processing on a digital image signal through a series of complex mathematical algorithm operations and finally transmit the processed signal to a display. The image processor 200 may be an image processing chip or a digital signal processor (DSP). A function of the DSP is to transfer data obtained by a photosensitive chip to a central processing unit quickly in time and refresh the photosensitive chip. Therefore, quality of the DSP directly affects quality of a picture (such as color saturation or definition).

In the embodiment shown in FIG. 1, the camera module 100 is disposed on a rear side of the terminal 1000, and is a rear-facing camera of the terminal 1000. It may be understood that in some embodiments, the camera module 100 may also be disposed on a front side of the terminal 1000, and is used as a front-facing camera of the terminal 1000. Both the front-facing camera and the rear-facing camera may be used for self-photographing, and may also be used by a photographer to photograph other objects.

In some embodiments, there are a plurality of camera modules 100, where "a plurality of" indicates two or more than two. The plurality of camera modules 100 can work in cooperation to achieve a good photographing effect. In the embodiment shown in FIG. 1, there are two rear-facing cameras of the terminal 1000, and two camera modules 100 are both communicatively connected to the image processor 200, so that the image processor 200 processes image data of the two camera modules 100 to obtain better pictures or images.

It should be understood that an installation position of the camera module 100 of the terminal 1000 in the embodiment shown in FIG. 1 is only an example. In other embodiments, the camera module 100 may also be installed in other positions of the mobile phone. For example, the camera module 100 may be installed in a middle of an upper part or an upper right corner on the rear side of the mobile phone. Alternatively, the camera module 100 may not be disposed on a body of the mobile phone, but disposed on a component capable of moving or rotating relative to the mobile phone. For example, the component can extend externally from the body of the mobile phone, retract, or rotate. The installation position of the camera module 100 is not limited in this application.

Figure 2:
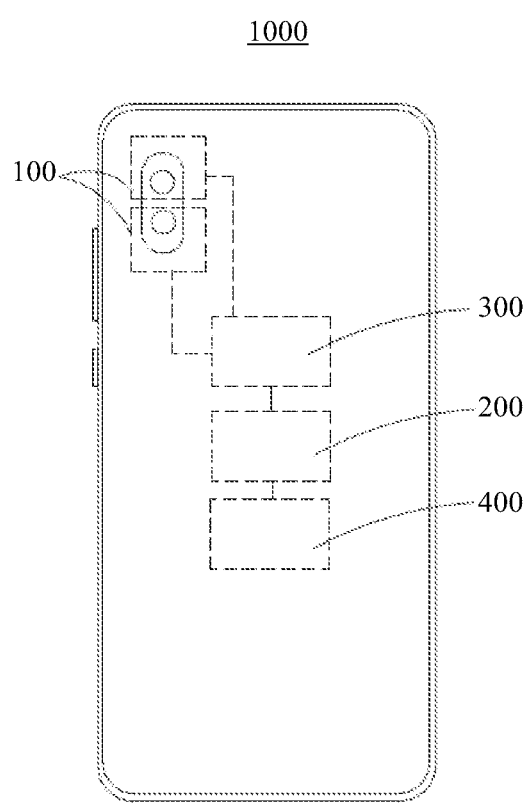
FIG. 2 is another schematic structural diagram of a terminal.

Referring to FIG. 2, in some embodiments, the terminal 1000 further includes an analog to digital converter (which may also be referred to as an A/D converter) 300. The analog to digital converter 300 is connected between the camera module 100 and the image processor 200. The analog to digital converter 300 is configured to convert a signal generated by the camera module 100 into a digital image signal and transmit the digital image signal to the image processor 200. Then the digital image signal is processed by the image processor 200, and finally, an image or a picture is displayed by using a display screen or a display.

In some embodiments, the terminal 1000 further includes a memory 400. The memory 400 is communicatively connected to the image processor 200. After the image processor 200 processes a digital image signal, the image processor 200 transmits an image to the memory 400, so that when the image needs to be viewed subsequently, the image can be found from the memory at any time and displayed on the display screen. In some embodiments, the image processor 200 further compresses the processed digital image signal, and then stores the image in the memory 400, to save space of the memory 400. It should be noted that FIG. 2 is only a schematic structural diagram of this embodiment of this application, where positions and structures of the camera module 100, the image processor 200, the analog to digital converter 300, the memory 400, and the like are only examples.

Figure 3A:
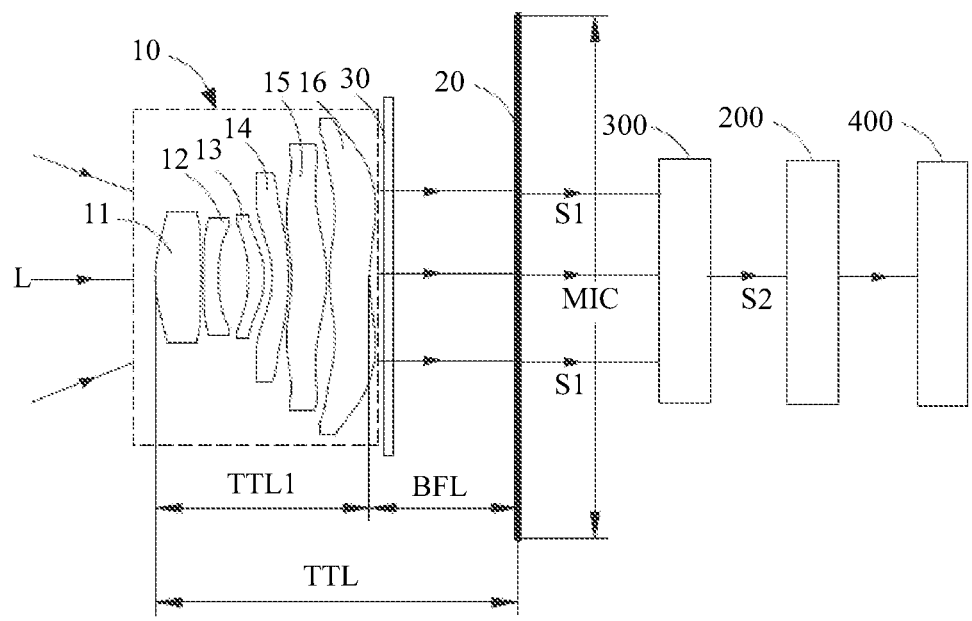
FIG. 3a is a schematic exploded diagram of a camera module according to an embodiment of this application.

Referring to FIG. 3a, the camera module 100 includes an optical lens 10 and a photosensitive element 20. The photosensitive element 20 is located on an image side of the optical lens 10, and when the camera module 100 works, a to-be-imaged object is imaged on the photosensitive element 20 through the optical lens 10. Specifically, an operating principle of the camera module 100 is as follows: Light L reflected by a photographed object passes through the optical lens 10, and an optical image is generated and projected on a surface of the photosensitive element 20. The photosensitive element 20 converts the optical image into an electrical signal, that is, an analog image signal S1, and transmits the analog image signal S1 obtained through conversion to the analog to digital converter 300, so that the analog to digital converter 300 converts the analog image signal S1 into a digital image signal S2 and transmits the digital image signal S2 to the image processor 200.

The photosensitive element 20 is a semiconductor chip, and its surface includes hundreds of thousands to millions of photodiodes and generates an electric charge when being illuminated by light, where the electric charge is converted by the analog to digital converter 300 into a digital signal. The photosensitive element 20 may be a charge coupled device (charge coupled device, CCD), or may be a complementary metal-oxide semiconductor (complementary metal-oxide semiconductor, CMOS). As a charge coupled device CCD, the photosensitive element 20 is made of a semiconductor material with high light sensitivity, and can convert light into an electric charge, where the electric charge is converted by the analog to digital converter 300 into a digital signal. The CCD includes a plurality of photosensitive units, and generally uses a megapixel as a unit. When a surface of the CCD is illuminated by light, each photosensitive unit reflects an electric charge on the CCD. Signals generated by all the photosensitive units are added together to form a complete picture. The complementary metal-oxide semiconductor CMOS mainly uses semiconductors made of two elements, silicon and germanium, so that an N-type (negatively charged) semiconductor and a P-type (positively charged) semiconductor coexist on the CMOS. A current generated by the two complementary effects may be recorded and decoded by the processing chip as an image.

The optical lens 10 affects imaging quality and an imaging effect. The optical lens 10 mainly uses a refraction principle of a lens element to perform imaging. To be specific, light from an object passes through the optical lens 10 to form a clear image on a focal plane, and the image of the object is recorded by using the photosensitive element 20 located on the focal plane. The optical lens 10 includes a plurality of lens elements arranged from an object side to the image side, and an image with a good imaging effect is formed through cooperation of the plurality of lens elements. The object side is a side on which a photographed object is located, and the image side is a side on which an image plane is located. In some embodiments, the optical lens 10 may be a lens with a fixed focal length, or may be a zoom lens. Specifically, a focal length of the optical lens 10 is changed by moving relative positions between different lens elements.

In some embodiments, the optical lens 10 can axially move relative to the photosensitive element 20, so that the optical lens 10 is close to or away from the photosensitive element 20. When the optical lens 10 does not work, that is, when the camera module 100 does not need to shoot an image or a picture, the optical lens 10 can be moved toward the photosensitive element 20, so that the lens elements are close to the image plane, that is, the plurality of lens elements are located in a back focal position at which the optical lens 10 works; or when the optical lens 10 works, the optical lens 10 is moved away from the photosensitive element 20, so that the photosensitive element 20 is located on the image plane of the optical lens 10 and that photographing can be performed.

Figure 3B:
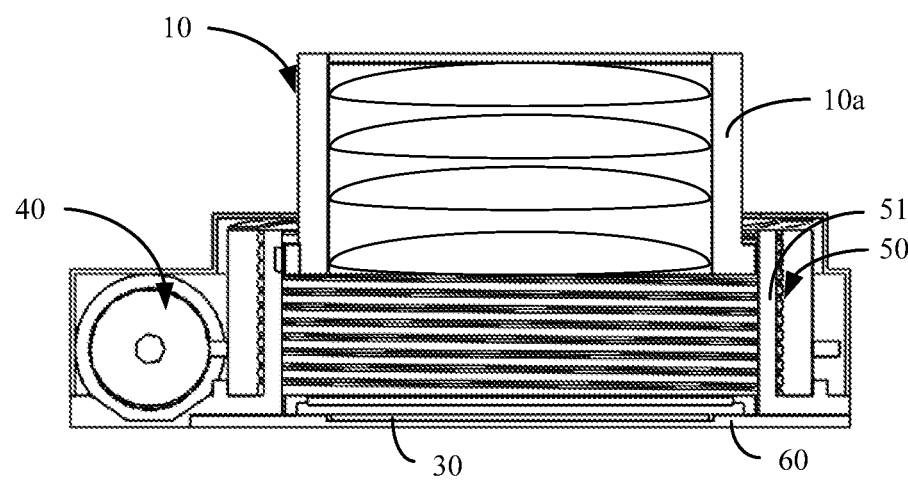
FIG. 3b is a schematic structural diagram of a camera module according to an embodiment of this application.

Referring to FIG. 3b, in some embodiments, the camera module 100 includes a driving portion 40. The driving portion 40 includes one or more driving members. The driving member of the driving portion 40 can be used to drive the optical lens 10 to perform focusing and/or optical image stabilization, and/or the driving portion 40 is used to drive the optical lens 10 to axially move relative to the photosensitive element 20. Therefore, when the optical lens 10 is not used, a lens element group can be moved close to the photosensitive element 20; or when the optical lens 10 needs to be used to perform photographing, a lens element group can be moved away from the photosensitive element 20 to a position to perform photographing. When the driving portion 40 drives the optical lens 10 to perform focusing, the driving member drives the lens elements of the optical lens 10 to perform relative movement to implement focusing. When the driving portion 40 drives the optical lens 10 to perform optical image stabilization, the optical lens 10 is driven to move or rotate relative to the photosensitive element 20, and/or the lens elements of the optical lens 10 are driven to move or rotate relative to each other, to implement optical image stabilization. The driving portion 40 may be a driving structure such as a motor or a motor.

In some embodiments, the camera module 100 further includes structures such as a holder 50 (holder), an infrared cut-off filter 30, and a line board 60. The optical lens 10 further includes a lens barrel 10a, the plurality of lens elements of the optical lens 10 are fixed in the lens barrel 10a, the lens elements fixed in the lens barrel 10a are coaxially disposed.

The photosensitive element 20 is fixed on the line board 60 in a manner of bonding, surface mounting, or the like. In addition, the analog to digital converter 300, the image processor 200, the memory 400, and so on are also fixed on the line board 60 in a manner of bonding, surface mounting, or the like. Therefore, communications connections between the photosensitive element 20, the analog to digital converter 300, the image processor 200, the memory 400, and so on are implemented by using the line board 60. In some embodiments, the holder is fixed on the line board 60. The line board 60 may be a flexible printed circuit (FPC) or a printed circuit board (printed circuit board, PCB), and is configured to transmit an electrical signal, where the FPC may be a single-sided flexible board, a double-sided flexible board, a multi-layer flexible board, a rigid flexible board, a flexible circuit board of a hybrid structure, or the like. Other elements included in the camera module 100 are not exhaustively described herein.

In some embodiments, the infrared cut-off filter 30 is also fixed on the line board 60, and is located between the optical lens and the photosensitive element 20. Light passing through the optical lens 10 illuminates the infrared cut-off filter 30, and is transmitted to the photosensitive element 20 through the infrared cut-off filter 30. The infrared cut-off filter may eliminate unnecessary light projected on the photosensitive element 20, and prevent the photosensitive element 20 from generating a false color or a ripple, to improve an effective resolution and color restoration of the photosensitive element 20. In some embodiments, the infrared cut-off filter 30 may also be fixed at one end of the optical lens 10 facing the image side.

In some embodiments, the holder 50 is fixed on the line board 60; the optical lens 10, the infrared cut-off filter 30, and the photosensitive element 20 are all accommodated in the holder 50; and the photosensitive element 20, the infrared cut-off filter 30, and the optical lens 10 are stacked in sequence over the line board 60, so that light passing through the optical lens 10 can illuminate the infrared cut-off filter 30 and can be transmitted to the photosensitive element 20 through the infrared cut-off filter 30. The lens barrel 10a of the optical lens 10 is connected to the holder 50 and can move relative to the holder 50. Specifically, in some embodiments of this application, the holder 50 includes a fixing barrel 51. Inner threads are provided on an inner wall of the fixing barrel 51, and outer threads are provided on an outer wall of the lens barrel 10*a*. The lens barrel 10*a* and the fixing barrel 51 are thread-connected. The lens barrel 10*a* is driven by the driving member to rotate, so that the lens barrel 10*a* moves in an axial direction relative to the fixing barrel 51 and that the lens elements of the optical lens 10 move close to or away from the photosensitive element 20. It may be understood that the lens barrel 10*a* may also be connected to the fixing barrel 50 in another manner and implement movement relative to the holder 50. For example, the lens barrel 10*a* and the holder 50 are connected by a slide rail. In some embodiments, the lens elements of the optical lens 10 are disposed in the lens barrel 10*a*, and can move relative to the lens barrel 10*a*, so that different lens elements can move relative to each other to perform focusing.

In this embodiment of this application, when the camera module 100 does not work, the lens elements of the optical lens 10 can be moved close to the photosensitive element 20, so that a thickness of the terminal 1000 can be approximately a thickness (that is, a size of the optical lens 10 in the axial direction) of the optical lens 10 plus a thickness of the photosensitive element 20. Therefore, the thickness of the optical lens 10 can be reduced as much as possible to make the terminal thinner. However, a total on-axis thickness (TTL1) of the plurality of lens elements basically determines the thickness of the optical lens 10. Therefore, adjustments may be made to a back focal length (BFL) of the optical lens elements and the total on-axis thickness of the plurality of lens elements (TTL1) of the optical lens elements to increase the back focal length (BFL) and reduce the total on-axis thickness of the plurality of lens elements (TTL1) of the optical lens 10, thereby reducing the thickness of the optical lens 10, and finally reducing the thickness of the terminal 1000. In this embodiment of this application, because the optical lens 10 has a great back focal length, the optical lens 10 can have a large aperture. Therefore, the optical lens 10 can achieve a good imaging effect and have higher practical application value.

In some embodiments, the plurality of lens elements of the optical lens 10 in this application include a first lens element 11, a second lens element 12, a third lens element 13, a fourth lens element 14, and a fifth lens element 15. All the lens elements are coaxially disposed, and each lens element includes an object-side surface facing the object side and an image-side surface facing the image side. It may be understood that the plurality of lens elements are all lens elements having positive refractive power or negative refractive power, and that when a plane mirror is inserted between the plurality of lens elements, the plane mirror is not considered as a lens element of the optical lens in this application. For example, when a plane mirror is inserted between the fourth lens element 14 and the fifth lens element 15, the plane mirror cannot be considered as a fifth lens element in this embodiment of this application. The optical lens 10 satisfies the following relations:

$$0.2 \le BFL/TTL \le 0.6, \text{ and}$$

$$0.2 \le TTL1/MIC \le 0.5,$$

where BFL is the back focal length of the optical lens 10, TTL is a total track length of the optical lens 10, TTL1 is the total on-axis thickness of the plurality of lens elements, the total on-axis thickness TTL1 of the plurality of lens elements is a distance from an intersection point between an axis of the optical lens 10 and an object-side surface of the first lens element 11 to an intersection point between the axis of the optical lens 10 and an image-side surface of a last lens element, and MIC is a maximum image circle diameter of the optical lens 10. It should be noted that meanings indicated by the terms BFL, TTL, TTL1, and MIC that appear in various positions in this application are the same. When the terms appear subsequently, their meanings are not described again.

In this embodiment of this application, when the back focal length (Back Focal Length, BFL) of the optical lens 10, the total track length (Total Track Length, TTL), the total on-axis thickness (Total Track Length 1, TTL1) of the plurality of lens elements, and the maximum image circle diameter (Maximum Image Circle, MIC) of the optical lens 10 satisfy the foregoing relations, the optical lens 10 can have a great back focal length (BFL) and a small total on-axis thickness (TTL1) of the plurality of lens elements while achieving high imaging performance. Specifically, a ratio of a BFL to a TTL of an ordinary optical lens is less than 0.07, far less than a ratio of the BFL to the TTL in this embodiment of this application; and a ratio of a TTL1 to an MIC of an ordinary optical lens 10 is generally greater than 0.6, far greater than the ratio of the TTL1 to the MIC of the optical lens 10 in this embodiment of this application. However, when a specification of the optical lens 10 is fixed, the TTL and the MIC are basically unchanged. Therefore, in this application, the back focal length BFL of the optical lens 10 is great, and the thickness TTL1 of the plurality of lens elements of the optical lens is small. Generally, the thickness of the optical lens 10 is generally determined by thicknesses of the lens elements in the optical lens 10. Therefore, the thickness of the optical lens 10 in this application can be small. In addition, in this embodiment of this application, because the back focal length BFL is great, the optical lens 10 can have a large aperture and achieve a good imaging effect. In some embodiments of this application, the back focal length (BFL) of the optical lens 10 satisfies 2.55 mm≤BFL≤4.17 mm. In comparison with an optical lens 10 whose back focal length is less than 1 mm, the back focal length of the optical lens 10 in this embodiment of this application is greatly increased. Because the back focal length in this application is increased, the camera module 100 can have a larger aperture and achieve a better photographing effect.

In some embodiments, the following relations are satisfied between the first lens element and the second lens element, and between the first lens element and the fifth lens element:

$$20 \le v1 - v2 \le 60, \text{ and}$$

$$-16 \le v1 - v5 \le 60,$$

where v1 is an Abbe number of the first lens element, v2 is an Abbe number of the second lens element, and v5 is an Abbe number of the fifth lens element.

Further, a range of a difference between Abbe numbers of the first lens element 11 and the second lens element 12, and a range of a difference between Abbe numbers of the first lens element 11 and the fifth lens element 15 are specified in this application, and the lens elements cooperate with each other to help reduce system dispersion, so that the optical lens 10 can have a good imaging effect.

In some embodiments of this application, each lens element of the optical lens 10 may be made of a plastic material, a glass material, or another composite material. The plastic material can easily make various optical lens element structures in various complex shapes. A refractive index $n_1$ of a lens element made of the glass material satisfies $1.50 \leq n_1 \leq 1.90$. In comparison with a refractive index range (1.55 to 1.65) of a plastic lens element, the refractive index of the lens element made of the glass material can be selected within a wide range, and a thin glass lens element with good performance is obtained more easily. This helps reduce the total on-axis thickness TTL1 of the plurality of lens elements of the optical lens 10, but it is difficult to make optical lens structures in complex shapes. Therefore, in some embodiments of this application, considering manufacturing costs, efficiency, and optical effects, specific materials used for different lens elements are properly arranged based on requirements.

In some embodiments of this application, at least one of the plurality of lens elements of the optical lens 10 includes a plurality of sub lens elements that fit into each other, and at least two of the plurality of sub lens elements are made of different materials. "At least one" means one or more than one. "A plurality of sub lens elements" may be two or more than two sub lens elements. Because sub lens elements made of different materials fit into each other to form one lens element, an Abbe number and a refractive index of the lens element are adjusted. This is equivalent to further expanding a refractive index range and an Abbe number range of the lens element. Therefore, a thin lens element with good performance is obtained more easily.

In some embodiments of this application, the first lens element 11 of the optical lens 10 is made of the glass material, so that a thin first lens element 11 with a strong aberration correction capability is obtained. It may be understood that in other embodiments of this application, the first lens element 11 may also be made of another composite material whose refractive index $n_1$ is within a range of 1.50 to 1.90. It should be noted that because a lens element of the optical lens 10 closer to the object side undertakes heavier optical path adjustment work, the lens element closer to the object side is more important for adjusting an optical effect. Because the first lens element 11 is made of the glass material, a best photographing effect can be achieved while few lenses made of glass materials are used.

In this application, the optical lens 10 includes a plurality of different lens elements, and combinations of different lens elements (for example, a sequence of lens elements arranged along an optical path, materials of lens elements, refractive indices, and shape curvatures) bring about different optical performance. In some embodiments of this application, the first lens element 11 has positive refractive power, and a main function of the first lens element 11 is a light concentration function. The object-side surface of the first lens element 11 near the axis is convex, and an image-side surface of the first lens element 11 near the axis is convex or concave. The first lens element 11 satisfies the following relations:

$$0.5 \leq f_1/f \leq 0.8 - 0.024 \leq R_1/R_2 < 0 \text{ or } 0 < R_1/R_2 \leq 0.404, \text{ and}$$

$$0.2 \leq d_1 / \sum d \leq 0.3,$$

where $f_1$ is a focal length of the first lens element 11, f is the focal length of the optical lens 10, $R_1$ is a curvature radius of the object-side surface of the first lens element 11, $R_2$ is a curvature radius of the image-side surface of the first lens element 11, d1 is an on-axis thickness of the first lens element 11, and $\Sigma d$ is a sum of on-axis thicknesses of all the lens elements. For example, when the optical lens 10 includes six lens elements, d1 is an on-axis thickness of the first lens element 11, d2 is an on-axis thickness of the second lens element 12, d3 is an on-axis thickness of the third lens element 13, d4 is an on-axis thickness of the fourth lens element 14, d5 is an on-axis thickness of the fifth lens element 15, and d6 is an on-axis thickness of the sixth lens element 16. In this case, $\Sigma d = d1+d2+d3+d4+d5+d6$.

The foregoing relations specify a range of a ratio of the focal length of the first lens element 11 to the focal length of the optical lens 10 and also specify a range of a ratio of the curvature radius of the object-side surface of the first lens element 11 to the curvature radius of the image-side surface of the first lens element 11, and indicate a light concentration capability of the first lens element 11, to help reduce system coma aberration and axial chromatic aberration. In addition, the ratio of the curvature radius of the object-side surface of the first lens element 11 to the curvature radius of the image-side surface of the first lens element 11 indicates convexity or concavity of the image-side surface and the object-side surface of the first lens element 11, to help reduce the total on-axis thickness TTL1 of the plurality of lens elements of the optical lens elements. Therefore, the thickness of the terminal 1000 can be reduced.

The foregoing relations are used to control a ratio of the on-axis thickness of the first lens element 11 to the sum of the on-axis thicknesses of the lens elements, so that a shape of the lens element can be limited, to ensure an appropriate lens element thickness.

The second lens element 12 has negative refractive power, an object-side surface of the second lens element 12 near the axis is convex, an image-side surface of the second lens element 12 near the axis is concave, and the following relations are satisfied:

$$-2.1 \leq f_2/f \leq -1.0,$$

$$1 \leq R_3/R_4 \leq 24, \text{ and}$$

$$0.06 \leq d2 / \sum d \leq 0.09,$$

where $f_2$ is a focal length of the second lens element 12, f is the focal length of the optical lens 10, $R_3$ is a curvature radius of the object-side surface of the second lens element 12, $R_4$ is a curvature radius of the image-side surface of the second lens element 12, d2 is an on-axis thickness of the second lens element 12, and $\Sigma d$ is the sum of the on-axis thicknesses of all the lens elements.

The foregoing relations specify a range of a ratio of the focal length of the second lens element 12 to the focal length of the optical lens 10 and specify a range of a ratio of the curvature radius of the object-side surface of the second lens element 12 to the curvature radius of the image-side surface of the second lens element 12, to help correct system dispersion or correct system spherical aberration. In addition, the ratio of the curvature radius of the object-side surface of the second lens element 12 to the curvature radius of the image-side surface of the second lens element 12 indicates convexity or concavity of the image-side surface and the object-side surface of the second lens element 12, to help reduce the total on-axis thickness TTL1 of the plurality of lens elements of the optical lens elements. Therefore, a thinner terminal 1000 can be obtained.

The foregoing relations are further used to control a ratio of the on-axis thickness of the second lens element 12 to the sum of the on-axis thicknesses of the lens elements, so that a shape of the lens element can be limited, to ensure an appropriate lens element thickness.

The third lens element 13 has positive refractive power or negative refractive power, positions of an object-side surface and an image-side surface of the third lens element 13 near the axis are both convex or concave, and the following relations are satisfied:

$$-80 \le f_3/f \le 1.2,$$

$$0.6 \le R_5/R_6 \le 3.6, \text{ and}$$

$$0.05 \le d3/\sum d \le 0.2,$$

where $f_3$ is a focal length of the third lens element 13, f is the focal length of the optical lens 10, $R_5$ is a curvature radius of the object-side surface of the third lens element 13, $R_6$ is a curvature radius of the image-side surface of the third lens element 13, d3 is an on-axis thickness of the third lens element 13, and Σd is the sum of the on-axis thicknesses of all the lens elements.

The foregoing relations specify a range of a ratio of the focal length of the third lens element 13 to the focal length of the optical lens 10 and also specify a range of a ratio of the curvature radius of the object-side surface of the third lens element 13 to the curvature radius of the image-side surface of the third lens element 13, to help correct system dispersion or correct system spherical aberration in cooperation with the third lens element 13. In addition, the ratio of the curvature radius of the object-side surface of the third lens element 13 to the curvature radius of the image-side surface of the third lens element 13 indicates convexity or concavity of the image-side surface and the object-side surface of the third lens element 13, to help reduce the total on-axis thickness TTL1 of the plurality of lens elements of the optical lens 10. Therefore, a thinner terminal 1000 can be obtained.

The foregoing relations are used to control a ratio of the on-axis thickness of the third lens element 13 to the sum of the on-axis thicknesses of the lens elements, so that a shape of the lens element can be limited, to ensure an appropriate lens element thickness.

A lens element closest to the image side has positive refractive power or negative refractive power, an object-side surface of the lens element near the axis is convex or concave, and an image-side surface of the lens element near the axis is concave. The lens element closest to the image side is the last lens element of the optical lens elements. For example, when the optical lens elements include six lens elements, the lens element closest to the image side is the sixth lens element; or when the optical lens elements include seven lens elements, the lens element closest to the image side is a seventh lens element. The lens element closest to the image side satisfies the following relations:

$$-1 \le f_n/f \le 4,$$

$$0.82 \le R_{2n-1}/R_{2n} \le 3.29, \text{ and}$$

$$0.2 \le d_n/\sum d \le 0.3,$$

where the plurality of lens elements are n lens elements, n being a natural number greater than or equal to 6, $f_n$ is a focal length of the lens element closest to the image side, f is the focal length of the optical lens 10, $R_{2n-1}$ is a curvature radius of the object-side surface of the lens element closest to the image side, $R_{2n}$ is a curvature radius of the image-side surface of the lens element closest to the image side, $d_n$ is an on-axis thickness of the lens element closest to the image side, and Σd is the sum of the on-axis thicknesses of all the lens elements.

The foregoing relations specify a range of a ratio of the focal length of the lens element closest to the image side to the focal length of the optical lens 10 and also specify a range of a ratio of the curvature radius of the object-side surface of the lens element closest to the image side to the curvature radius of the image-side surface of the lens element closest to the image side, to help increase an amount of light passing through the system and correct distortion. In addition, the ratio of the curvature radius of the object-side surface of the lens element closest to the image side to the curvature radius of the image-side surface of the lens element closest to the image side indicates convexity or concavity of the image-side surface and the object-side surface of the lens element closest to the image side, to help reduce the total on-axis thickness TTL1 of the plurality of lens elements of the optical lens elements. Therefore, a thinner terminal 1000 can be obtained.

The foregoing relations are used to control a ratio of the on-axis thickness of the lens element closest to the image side to the sum of the on-axis thicknesses of the lens elements, so that a shape of the lens element can be limited, to ensure an appropriate lens element thickness.

It should be noted that being convex or concave near the axis means being convex or concave in a position infinitely close to the axis of the lens element. That is, "near the axis" means being in a position infinitely close to the axis. It should be noted that the shape of the lens element, and the convexity or concavity of the object-side surface and the image-side surface are merely examples and do not constitute any limitation on this embodiment of this application. Convexity or concavity of parts of the object-side surface and the image-side surface away from the optical axis is not limited in this embodiment of this application.

In some embodiments of this application, the image-side surface and the object-side surface of each lens element are both aspherical, and the image-side surface and the object-side surface of each lens element satisfy the following formula:

$$x = \frac{cr^2}{1+\sqrt{1-Kc^2r^2}} + u^4 \sum_{m=0}^{M} a_m Q_m^{con}(u^2)$$

where x is an aspherical sagitta, r is an aspherical radial coordinate, c is a spherical curvature of an aspherical vertex, K is a quadratic surface constant, $a_m$ is an aspherical coefficient, and $u=r/r_{max}$ where $r_{max}$ is a maximum value of a radial radius coordinate.

Alternatively, in some embodiments, the image-side surface and the object-side surface of each lens element are both aspherical, and the image-side surface and the object-side surface of each lens element satisfy the following formula:

$$y = \frac{cr^2}{1 + \sqrt{1-(1+K)c^2r^2}} + \sum_{i=1}^{N} a_i \rho^i$$

where y is an aspherical sagitta, r is an aspherical radial coordinate, c is a spherical curvature of an aspherical vertex, K is a quadratic surface constant, $a_i$ is an aspherical coefficient, and ρ is a normalized axial coordinate. The foregoing relation is used to obtain different aspherical lens elements, so that different lens elements can achieve different optical effects. Therefore, a good photographing effect is achieved through cooperation of various aspherical lens elements.

It should be understood that optical design parameters of the third lens element 13 and the lens element closest to the image side are not specifically limited in this embodiment of this application.

Based on the relations and ranges provided by some embodiments of this application, a configuration mode of the lens elements and a combination of lens elements having specific optical design parameters can enable the optical lens 10 to satisfy requirements for a great back focal length and a small TTL1 and achieve high imaging performance.

The following describes in more detail some specific but nonrestrictive examples of embodiments of this application with reference to FIG. 4 to FIG. 23.

Figure 4:
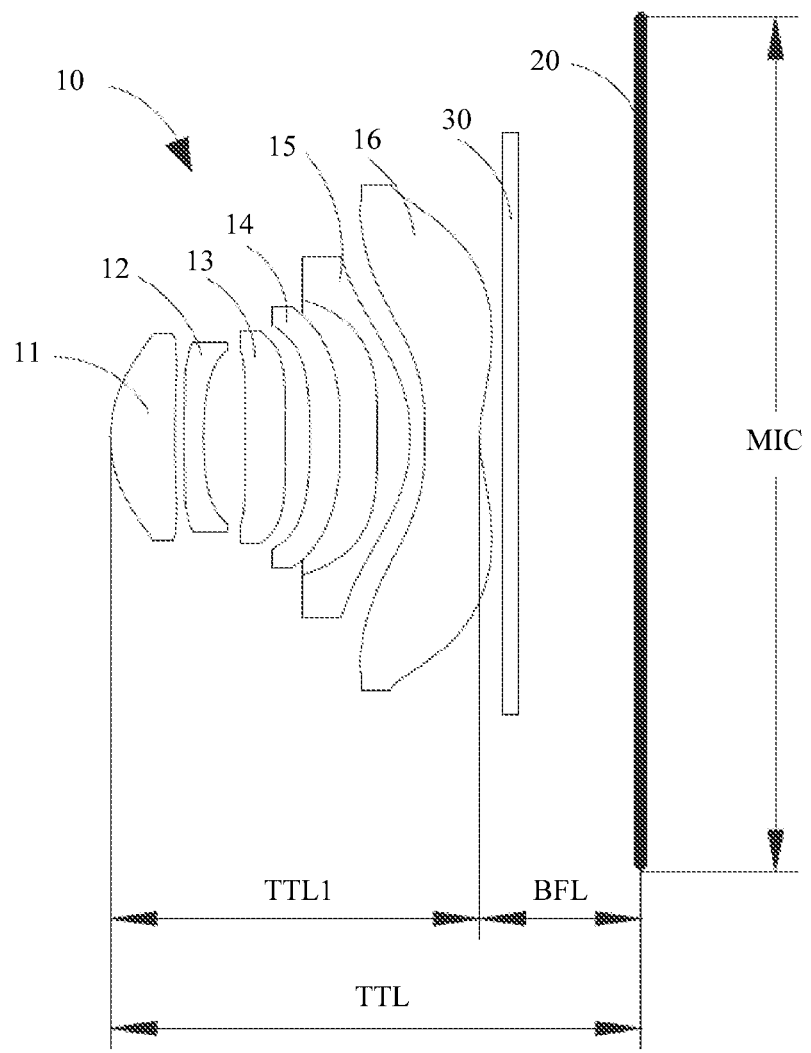
FIG. 4 is a partial schematic structural diagram of an optical lens according to a first embodiment of this application.

FIG. 4 is a schematic structural diagram of an optical lens 10 according to a first embodiment of this application. In this embodiment, the optical lens 10 includes six lens elements, which are respectively a first lens element 11, a second lens element 12, a third lens element 13, a fourth lens element 14, a fifth lens element 15, and a sixth lens element 16. The first lens element 11, the second lens element 12, the third lens element 13, the fourth lens element 14, the fifth lens element 15, and the sixth lens element 16 are disposed in sequence from an object side to an image side, and the lens elements are coaxially disposed.

The first lens element 11 has positive refractive power, an object-side surface of the first lens element 11 near an axis is convex, and an image-side surface of the first lens element 11 near the axis is convex. The second lens element 12 has negative refractive power, an object-side surface of the second lens element 12 near the axis is convex, and an image-side surface of the second lens element 12 near the axis is concave. The third lens element 13 has positive refractive power, an object-side surface of the third lens element 13 near the axis is concave, and an image-side surface of the third lens element 13 near the axis is convex. The fourth lens element 14 has negative refractive power. The fifth lens element 15 has positive refractive power. The sixth lens element 16 has positive refractive power, an object-side surface of the sixth lens element 16 near the axis is concave, and an image-side surface of the sixth lens element 16 near the axis is concave.

In this embodiment, the first lens element 11 is made of a glass material. The second lens element 12, the third lens element 13, and the fourth lens element 14 are made of plastic materials. The fifth lens element 15 and the sixth lens element 16 are both made of plastic materials.

Based on the foregoing relations, design parameters in the first embodiment of this application are shown in Table 1.

TABLE 1

Design parameters of the optical lens in the first embodiment

| BFL | 4.05 | BFL/TTL | 0.356 | TTL1/MIC | 0.42 |
|---|---|---|---|---|---|
| n1 | 1.85 | $R_1/R_2$ | -0.024 | $R_3/R_4$ | 23.796 |
| v1-v2 | 20.9 | $f_1/f$ | 0.572 | $f_2/f$ | -0.956 |
| v1-v5 | -15.9 | $R_5/R_6$ | 2.072 | $R_{11}/R_{12}$ | 0.835 |
| v3-v6 | -36.8 | $f_3/f$ | 0.741 | $f_6/f$ | 3.927 |
| d1/(d1 + d2 + d3 + d4 + d5 + d6) | | 0.272 | d2/(d1 + d2 + d3 + d4 + d5 + d6) | | 0.086 |
| d3/(d1 + d2 + d3 + d4 + d5 + d6) | | 0.096 | d6/(d1 + d2 + d3 + d4 + d5 + d6) | | 0.241 |

In the table, f indicates a focal length of the optical lens 10, n1 indicates a refractive index of the first lens element 11, v1 indicates an Abbe number of the first lens element 11, v2 indicates an Abbe number of the second lens element 12, v3 indicates an Abbe number of the third lens element 13, v6 indicates an Abbe number of the sixth lens element 16, $f_1$ indicates a focal length of the first lens element 11, $f_2$ indicates a focal length of the second lens element 12, $f_3$ indicates a focal length of the third lens element 13, $f_6$ indicates a focal length of the sixth lens element 16, $R_1$ indicates a curvature radius of the object-side surface of the first lens element 11, $R_2$ indicates a curvature radius of the image-side surface of the first lens element 11, $R_3$ indicates a curvature radius of the object-side surface of the second lens element 12, $R_4$ indicates a curvature radius of the image-side surface of the second lens element 12, $R_5$ indicates a curvature radius of the object-side surface of the third lens element 13, $R_6$ indicates a curvature radius of the image-side surface of the third lens element 13, $R_{11}$ indicates a curvature radius of the object-side surface of the sixth lens element 16, $R_{12}$ indicates a curvature radius of the image-side surface of the sixth lens element 16, d1 indicates an on-axis thickness of the first lens element 11, d2 indicates an on-axis thickness of the second lens element 12, d3 indicates an on-axis thickness of the third lens element 13, d4 indicates an on-axis thickness of the fourth lens element 14, d5 indicates an on-axis thickness of the fifth lens element 15, and d6 indicates an on-axis thickness of the sixth lens element 16. It should be noted that meanings indicated by symbols f, n1, v1, v2, v6, $f_1$, $f_2$, $f_3$, $f_6$, $R_1$, $R_2$, $R_3$, $R_4$, $R_5$, $R_6$, $R_{11}$, $R_{12}$, d2, d4, d5, and d6, and the like are the same in this application. When the symbols appear again subsequently, their meanings are not described again.

Table 2 shows basic parameters of the optical lens 10 in this embodiment of this application.

TABLE 2

Basic parameters of the optical lens in the first embodiment

| Focal length f | 9.29 mm |
|---|---|
| Aperture F value | 2.25 |
| Half FOV | 41° |
| Total track length TTL | 11.34 mm |
| Design wavelength | 650 nm, 610 nm, 555 nm, 510 nm, and 470 nm |

In this embodiment, a surface type x of each Q-type aspherical lens element in the first lens element 11 to the sixth lens element 16 may be defined, without limitation, by using the following aspherical formula:

$$x = \frac{cr^2}{1+\sqrt{1-Kc^2r^2}} + u^4 \sum_{m=0}^{M} a_m Q_m^{con}(u^2)$$

where x is an aspherical sagitta, r is an aspherical radial coordinate, c is a spherical curvature of an aspherical vertex, K is a quadratic surface constant, $a_m$ is an aspherical coefficient, and $u=r/r_{max}$, where $r_{max}$ is a maximum value of a radial radius coordinate.

In this embodiment, different lens elements of the optical lens 10 obtained by using the design parameters above can implement different functions respectively, so that the optical lens 10 having good imaging quality is obtained through cooperation of the lens elements. Specifically, in this embodiment, the first lens element 11 can effectively reduce system coma aberration and axial chromatic aberration, the second lens element 12 and the third lens element 13 can effectively correct system astigmatism through cooperation, the fourth lens element 14 can effectively correct system spherical aberration, the fifth lens element 15 can reduce aberration of an edge field of view and correct coma aberration, and the sixth lens element 16 can increase an amount of light passing through a system and correct distortion. It should be noted that only functions implemented by the lens elements in this embodiment are provided herein. In other embodiments of this application, lens elements can implement other functions. The functions are not limited herein.

Figure 5:
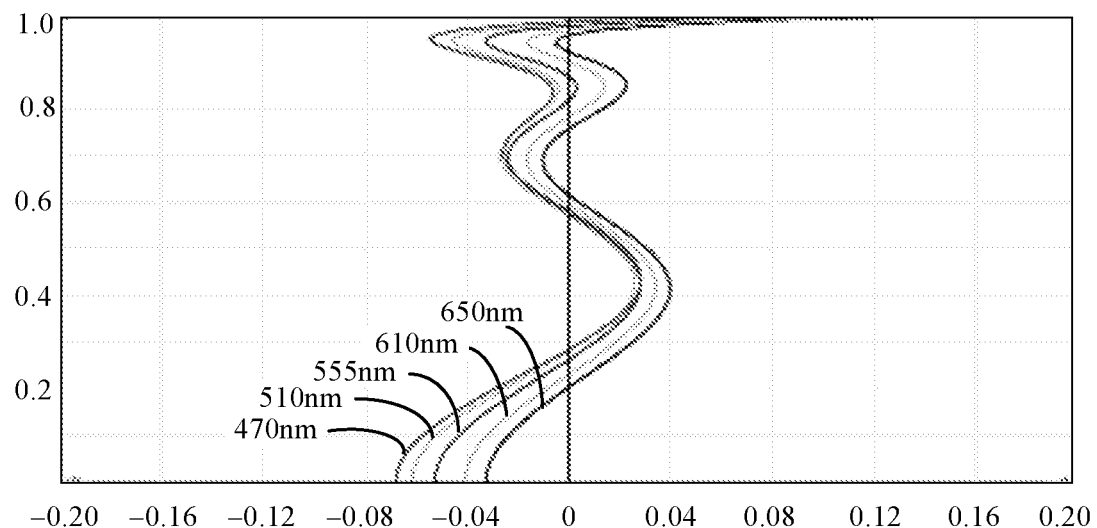
FIG. 5 is a schematic diagram of axial chromatic aberration of the optical lens according to the first embodiment of this application.
Figure 6:
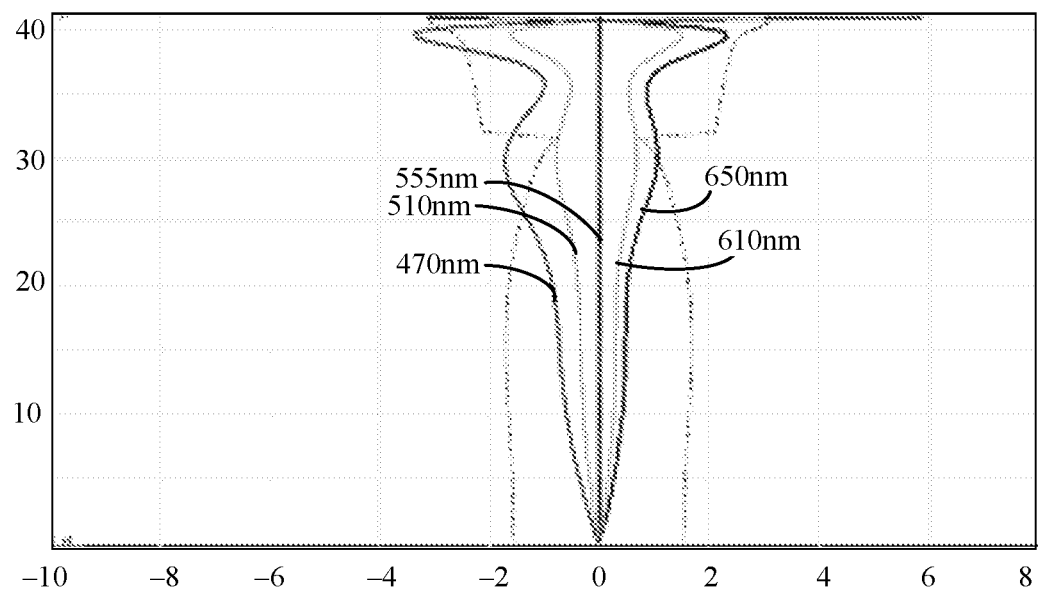
FIG. 6 is a schematic diagram of lateral chromatic aberration of the optical lens according to the first embodiment of this application.
Figure 7:
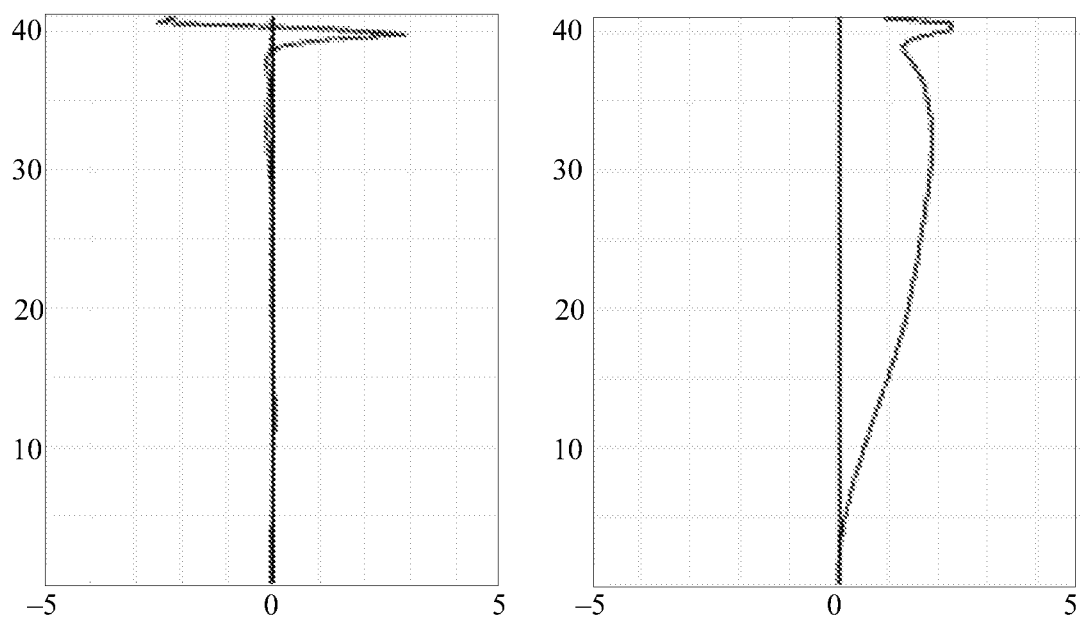
FIG. 7 is a schematic diagram of a field curvature and optical distortion of the optical lens according to the first embodiment of this application.

FIG. 5 to FIG. 7 are diagrams for characterization of optical performance of the optical lens 10 in the first embodiment.

Specifically, FIG. 5 shows axial aberration after light of wavelengths 650 nm, 610 nm, 555 nm, 510 nm, and 470 nm respectively passes through the optical lens 10 in the first embodiment. In FIG. 5, a vertical coordinate represents a normalized pupil coordinate, and a horizontal coordinate represents axial aberration, in units of milliseconds. As can be seen from FIG. 5, the axial aberration in this embodiment is controlled within a very small range.

FIG. 6 shows lateral color after light of wavelengths 650 nm, 610 nm, 555 nm, 510 nm, and 470 nm respectively passes through the optical lens 10 in the first embodiment. In FIG. 6, a vertical coordinate represents a field of view, in units of degrees (°), and a horizontal coordinate represents a diffraction limit range, in units of microns (μm). A dashed line in FIG. 6 represents a diffraction limit range of the optical lens 10. As can be learned from the figure, lateral color after light of each wavelength passes through the optical lens 10 in the first embodiment is basically within the diffraction limit range, that is, the lateral color after the light of each wavelength passes through the optical lens 10 in the first embodiment basically does not affect imaging quality of the optical lens 10.

FIG. 7 shows a schematic diagram of a field curvature and optical distortion after light of the wavelength 555 nm passes through the optical lens 10 in the first embodiment, used to indicate a difference between imaging deformation and an ideal shape after the light passes through the optical lens 10. In a left drawing in FIG. 7, a solid line is a schematic diagram of a field curvature in a meridian direction after the light of the wavelength 555 nm passes through the optical lens 10; and a dashed line is a schematic diagram of a field curvature in a sagittal direction after the light of the wavelength 555 nm passes through the optical lens 10. A right drawing in FIG. 7 is a schematic diagram of optical distortion after the light of the wavelength 555 nm passes through the optical lens 10 in the first embodiment. As can be seen from the figure, in this embodiment, the optical system controls distortion within a range recognizable by unaided eyes (2% and below unrecognizable by unaided eyes).

A back focal length BFL of the optical lens 10 provided in this embodiment is 4.05 mm, and a total track length TTL is 11.34 mm. In this case, a TTL1 is 7.34 mm. In this case, a thickness of a terminal 1000 may be about 7.34 mm, so that the terminal 1000 has a small thickness while having good imaging quality.

Figure 8:
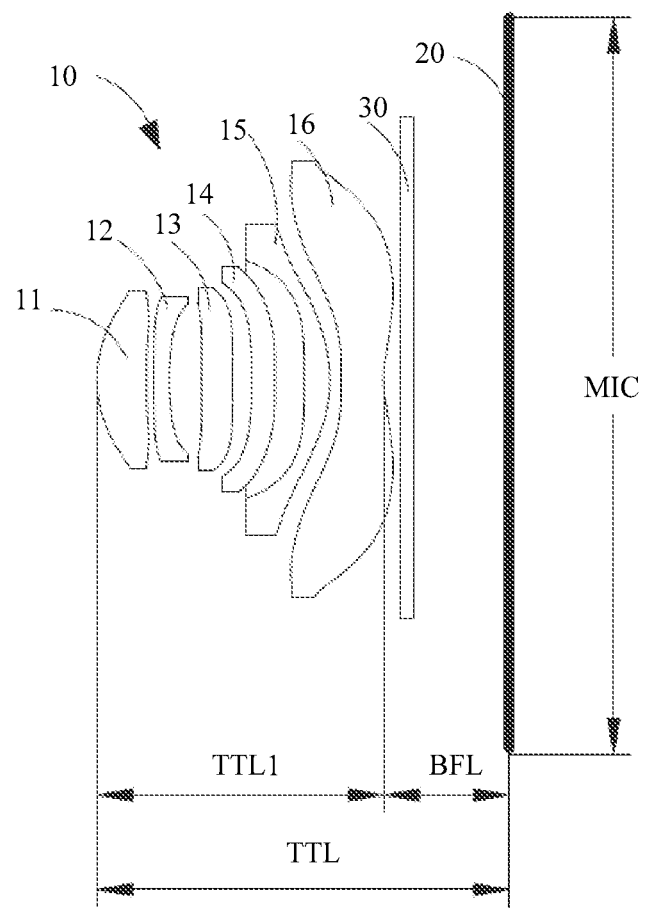
FIG. 8 is a partial schematic structural diagram of an optical lens according to a second embodiment of this application.

FIG. 8 shows an optical lens 10 according to a second embodiment of this application. In this embodiment, the optical lens 10 includes six lens elements, which are respectively a first lens element 11, a second lens element 12, a third lens element 13, a fourth lens element 14, a fifth lens element 15, and a sixth lens element 16. The first lens element 11, the second lens element 12, the third lens element 13, the fourth lens element 14, the fifth lens element 15, and the sixth lens element 16 are disposed in sequence from an object side to an image side, and the lens elements are coaxially disposed.

The first lens element 11 has positive refractive power, an object-side surface of the first lens element 11 near an axis is convex, and an image-side surface of the first lens element 11 near the axis is concave. The second lens element 12 has negative refractive power, an object-side surface of the second lens element 12 near the axis is convex, and an image-side surface of the second lens element 12 near the axis is concave. The third lens element 13 has negative refractive power, an object-side surface of the third lens element 13 near the axis is convex, and an image-side surface of the third lens element 13 near the axis is concave. The fourth lens element 14 has positive refractive power. The fifth lens element 15 has positive refractive power. The sixth lens element 16 has negative refractive power, an object-side surface of the sixth lens element 16 near the axis is convex, and an image-side surface of the sixth lens element 16 near the axis is concave.

In this embodiment, the first lens element 11 is made of a glass material. The second lens element 12, the third lens element 13, and the fourth lens element 14 are made of plastic materials. The fifth lens element 15 and the sixth lens element 16 are both made of plastic materials.

Based on the foregoing relations, design parameters in another embodiment of this application are shown in Table 3. For meanings of the parameters, refer to related descriptions in the first embodiment.

TABLE 3

Design parameters of the optical lens in the second embodiment

| | | | | | |
|---|---|---|---|---|---|
| BFL | 2.55 | BFL/TTL | 0.27 | TTL1/MIC | 0.42 |
| n1 | 1.69 | $R_1/R_2$ | 0.404 | $R_3/R_4$ | 9.299 |
| v1-v2 | 31.7 | $f_1/f$ | 0.778 | $f_2/f$ | −2.031 |
| v1-v3 | −2.8 | $R_5/R_6$ | 1.02 | $R_{11}/R_{12}$ | 3.245 |
| v1-v4 | 29.2 | $f_3/f$ | −79.420 | $f_6/f$ | −0.929 |
| d1/(d1 + d2 + d3 + d4 + d5 + d6) | | 0.253 | d2/(d1 + d2 + d3 + d4 + d5 + d6) | | 0.084 |
| d3/(d1 + d2 + d3 + d4 + d5 + d6) | | 0.157 | d6/(d1 + d2 + d3 + d4 + d5 + d6) | | 0.253 |

Meanings of symbols in Table 3 are the same as the meanings of the symbols in Table 1.

Table 4 shows basic parameters of the optical lens 10 in the second embodiment of this application.

TABLE 4

Basic parameters of the optical lens in the second embodiment

| | |
|---|---|
| Focal length f | 8.69 mm |
| Aperture F value | 2.2 |
| Half FOV | 42.0° |
| Total track length TTL | 9.47 mm |
| Design wavelength | 650 nm, 610 nm, 555 nm, 510 nm, and 470 nm |

In this embodiment, the image-side surface and the object-side surface of each lens element of the optical lens 10 are both extended odd aspheres. A surface type x of the image-side surface and the object-side surface of the first lens element 11 to a surface type x of the image-side surface and the object-side surface of the sixth lens element 16 may be defined, without limitation, by using the following aspherical formula:

$$y = \frac{cr^2}{1 + \sqrt{1 - (1+K)c^2r^2}} + \sum_{i=1}^{N} a_i \rho^i$$

where y is an aspherical sagitta, r is an aspherical radial coordinate, c is a spherical curvature of an aspherical vertex, K is a quadratic surface constant, $a_i$ is an aspherical coefficient, and $\rho$ is a normalized axial coordinate.

In this embodiment, different lens elements of the optical lens 10 obtained by using the design parameters above can implement different functions respectively, so that the optical lens 10 having good imaging quality is obtained through cooperation of the lens elements. Specifically, in this embodiment, the first lens element 11 can effectively reduce system coma aberration and axial aberration, the second lens element 12 and the third lens element 13 can effectively correct system astigmatism through cooperation, the fourth lens element 14 can effectively correct system spherical aberration, the fifth lens element 15 can reduce aberration of an edge field of view and correct coma aberration, and the sixth lens element 16 can increase an amount of light passing through a system and correct distortion. It should be noted that only functions implemented by the lens elements in this embodiment are provided herein. In other embodiments of this application, lens elements can implement other functions. The functions are not limited herein.

It should be noted that only functions implemented by the lens elements in this embodiment are provided herein. In other embodiments of this application, lens elements can implement other functions. The functions are not limited herein.

Figure 9:
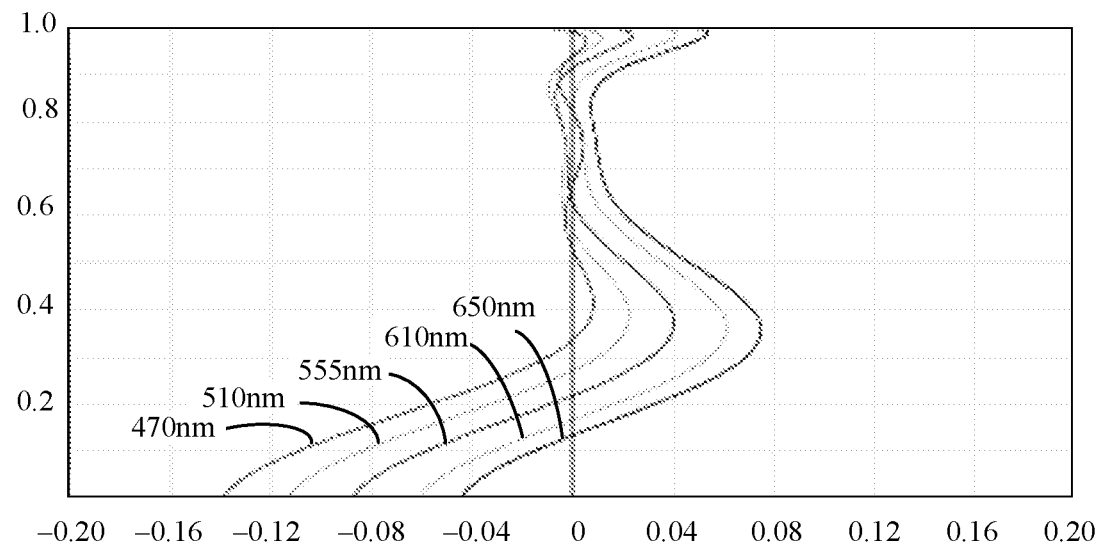
FIG. 9 is a schematic diagram of axial chromatic aberration of the optical lens according to the second embodiment of this application.
Figure 10:
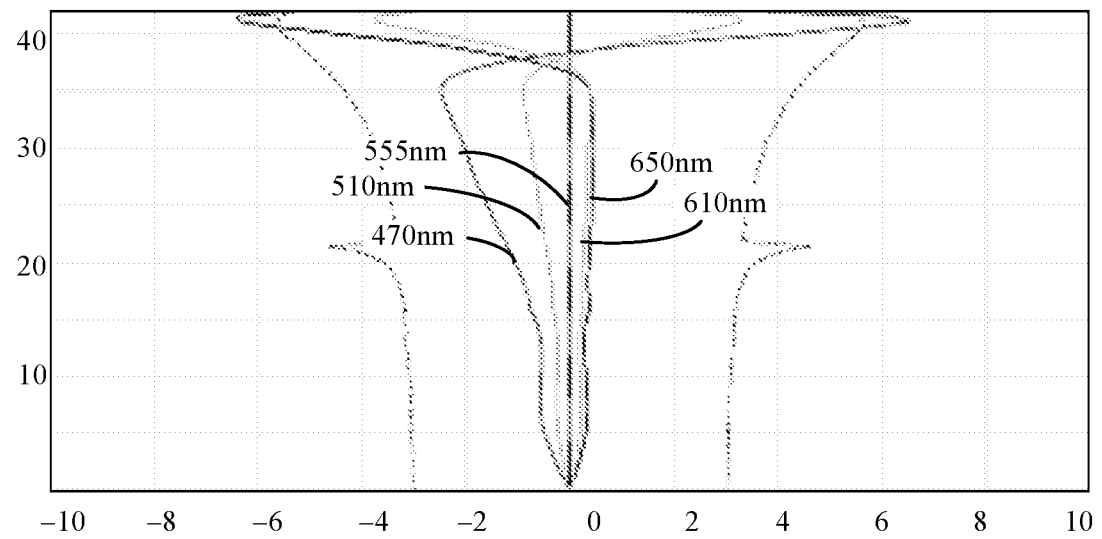
FIG. 10 is a schematic diagram of lateral chromatic aberration of the optical lens according to the second embodiment of this application.
Figure 11:
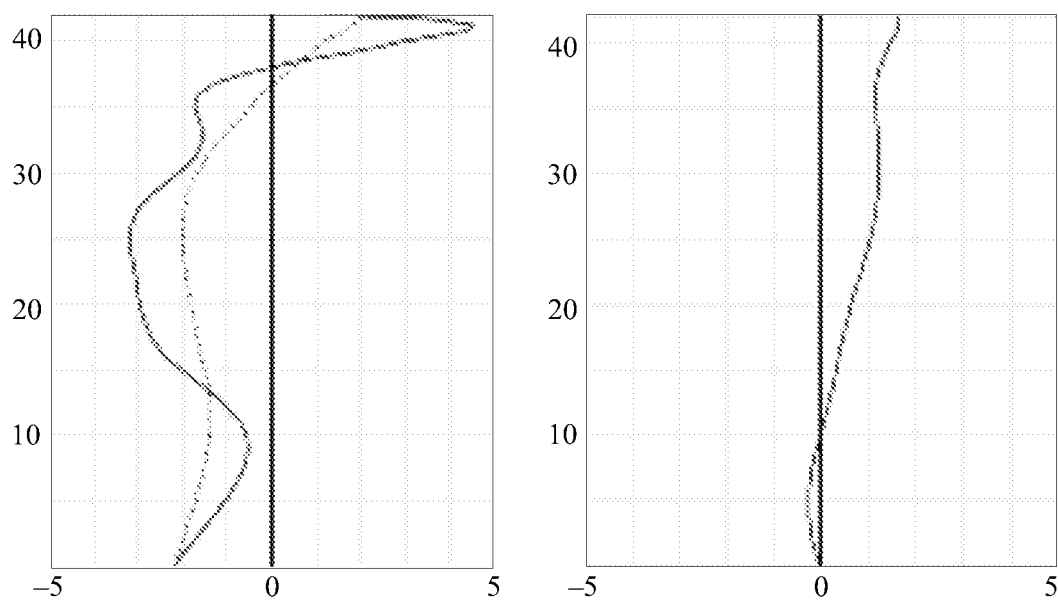
FIG. 11 is a schematic diagram of a field curvature and optical distortion of the optical lens according to the second embodiment of this application.

FIG. 9 to FIG. 11 are diagrams for characterization of optical performance of the optical lens 10 in the second embodiment.

Specifically, FIG. 9 shows axial aberration after light of wavelengths 650 nm, 610 nm, 555 nm, 510 nm, and 470 nm respectively passes through the optical lens 10 in the second embodiment. In FIG. 9, a vertical coordinate represents a normalized pupil coordinate, and a horizontal coordinate represents axial aberration, in units of milliseconds. As can be seen from FIG. 9, the axial aberration in this embodiment is controlled within a very small range.

FIG. 10 shows lateral color after light of wavelengths 650 nm, 610 nm, 555 nm, 510 nm, and 470 nm respectively passes through the optical lens 10 in the second embodiment. In FIG. 10, a vertical coordinate represents a field of view, in units of degrees (°), and a horizontal coordinate represents a diffraction limit range, in units of microns (μm). A dashed line in FIG. 10 represents a diffraction limit range of the optical lens 10. As can be learned from the figure, all lateral color after light of each wavelength passes through the optical lens 10 in the second embodiment is within the diffraction limit, that is, the lateral color after the light of each wavelength passes through the optical lens 10 in the second embodiment basically does not affect imaging quality of the optical lens 10.

FIG. 11 shows a schematic diagram of a field curvature and optical distortion after light of the wavelength 555 nm passes through the optical lens 10 in the second embodiment, used to indicate a difference between imaging deformation and an ideal shape after the light passes through the optical lens 10. In a left drawing in FIG. 11, a solid line is a schematic diagram of a field curvature in a meridian direction after the light of the wavelength 555 nm passes through the optical lens 10; and a dashed line is a schematic diagram of a field curvature in a sagittal direction after the light of the wavelength 555 nm passes through the optical lens 10. A right drawing in FIG. 11 is a schematic diagram of optical distortion after the light of the wavelength 555 nm passes through the optical lens 10 in the second embodiment. As can be seen from the figure, in this embodiment, the optical system controls distortion within a range recognizable by unaided eyes (2% and below unrecognizable by unaided eyes), that is, the optical lens elements can achieve a high-quality imaging effect.

A back focal length BFL of the optical lens 10 provided in this embodiment is 2.55 mm, and a total track length TTL is 9.47 mm. In this case, a length of a TTL1 is 6.92 mm. In this case, a thickness of a terminal 1000 may be about 6.92 mm, so that the terminal 1000 has a small thickness while having good imaging quality.

Figure 12:
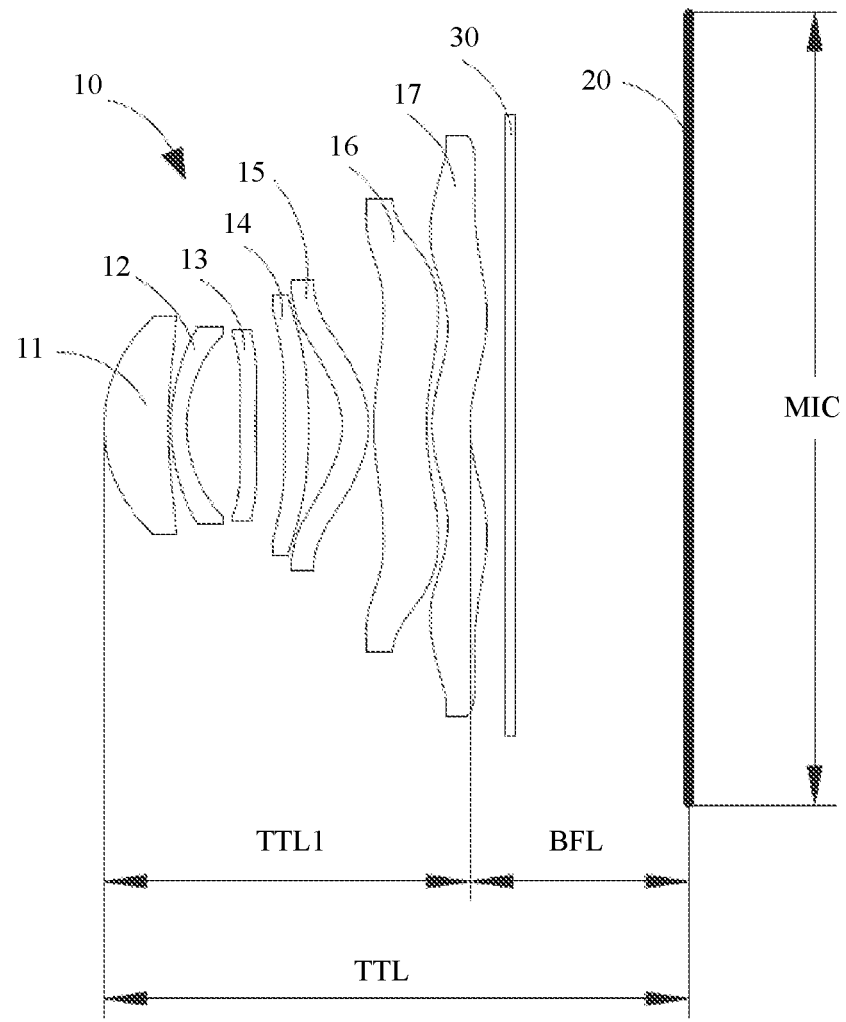
FIG. 12 is a partial schematic structural diagram of an optical lens according to a third embodiment of this application.

FIG. 12 shows an optical lens 10 according to a third embodiment of this application. In this embodiment, the optical lens 10 includes seven lens elements, which are respectively a first lens element 11, a second lens element 12, a third lens element 13, a fourth lens element 14, a fifth lens element 15, a sixth lens element 16, and a seventh lens element 17. The first lens element 11, the second lens element 12, the third lens element 13, the fourth lens element 14, the fifth lens element 15, the sixth lens element 16, and the seventh lens element 17 are disposed in sequence from an object side to an image side, and the lens elements are coaxially disposed.

The first lens element 11 has positive refractive power, an object-side surface of the first lens element 11 near an axis is convex, and an image-side surface of the first lens element 11 near the axis is concave. The second lens element 12 has negative refractive power, an object-side surface of the second lens element 12 near the axis is convex, and an image-side surface of the second lens element 12 near the axis is concave. The third lens element 13 has negative refractive power, an object-side surface of the third lens element 13 near the axis is concave, and an image-side surface of the third lens element 13 near the axis is convex. The fourth lens element 14 has positive refractive power. The fifth lens element 15 has negative refractive power. The sixth lens element 16 has positive refractive power, an object-side surface of the sixth lens element 16 near the axis is convex, and an image-side surface of the sixth lens element 16 near the axis is concave. The seventh lens element 17 has positive refractive power, an object-side surface of the seventh lens element 17 near the axis is convex, and an image-side surface of the seventh lens element 17 near the axis is concave.

In this embodiment, the first lens element 11, the second lens element 12, the third lens element 13, the fourth lens element 14, the fifth lens element 15, the sixth lens element 16, and the seventh lens element 17 are all made of plastic materials.

Based on the foregoing relations, design parameters of the optical lens 10 in the third embodiment of this application are shown in the following Table 5. For meanings of the parameters, refer to related descriptions in the first embodiment.

TABLE 5

Design parameters of the optical lens in the third embodiment

| BFL | 4.173 | BFL/TTL | 0.375 | TTL1/MIC | 0.439 |
|---|---|---|---|---|---|
| n1 | 1.54 | $R_1/R_2$ | 0.266 | $R_3/R_4$ | 1.373 |
| v1-v2 | 36.8 | $f_1/f$ | 0.687 | $f_2/f$ | −1.574 |
| v1-v3 | 36.8 | $R_5/R_6$ | 1.693 | $R_{11}/R_{12}$ | 0.85 |
| v1-v4 | 0 | $f_3/f$ | −4.528 | $f_6/f$ | 3.631 |
| — | — | $R_{13}/R_{14}$ | 0.956 | $f_7/f$ | 3.833 |
| d1/(d1 + d2 + d3 + d4 + d5 + d6 + d7) | 0.271 | d2/(d1 + d2 + d3 + d4 + d5 + d6 + d7) | | | 0.066 |
| d3/(d1 + d2 + d3 + d4 + d5 + d6 + d7) | 0.066 | d6/(d1 + d2 + d3 + d4 + d5 + d6 + d7) | | | 0.224 |
| d7/(d1 + d2 + d3 + d4 + d5 + d6 + d7) | 0.159 | — | | | — |

In the table, d7 indicates a thickness of the seventh lens element 17, $f_7$ indicates a focal length of the seventh lens element 17, $R_{13}$ indicates a curvature radius of the object-side surface of the seventh lens element 17, and $R_{14}$ indicates a curvature radius of the image-side surface of the seventh lens element 17. Meanings indicated by d7, $f_7$, $R_{13}$, and $R_{14}$ are the same in this application. When the symbols appear subsequently, their meanings are not described again.

Table 6 shows basic parameters of the optical lens 10 in the third embodiment of this application.

TABLE 6

Basic parameters of the optical lens in the third embodiment

| Focal length f | 9.769 mm |
|---|---|
| Aperture F value | 2.2 |
| Half FOV | 39.0° |
| Total track length TTL | 11.141 mm |
| Design wavelength | 650 nm, 610 nm, 555 nm, 510 nm, and 470 nm |

In this embodiment, the image-side surface and the object-side surface of each lens element of the optical lens 10 are both extended even aspheres.

In this embodiment, a surface type y of the image-side surface and the object-side surface of the first lens element 11 to a surface type y of the image-side surface and the object-side surface of the seventh lens element 17 may be defined, without limitation, by using the following aspherical formula:

$$y = \frac{cr^2}{1 + \sqrt{1 - (1 + K)c^2 r^2}} + \sum_{i=1}^{N} a_i \rho^i$$

where y is an aspherical sagitta, r is an aspherical radial coordinate, c is a spherical curvature of an aspherical vertex, K is a quadratic surface constant, $a_i$ is an aspherical coefficient, and $\rho$ is a normalized axial coordinate.

In this embodiment, different lens elements of the optical lens 10 obtained by using the design parameters above can implement different functions respectively, so that the optical lens 10 having good imaging quality is obtained through cooperation of the lens elements. Specifically, in this embodiment, the first lens element 11 can effectively reduce system aberration, the second lens element 12 can effectively correct system spherical aberration, the third lens element 13 can effectively correct system astigmatism, the fourth lens element 14 can effectively correct system spherical aberration, the fifth lens element 15 can reduce distortion of an edge field of view and correct astigmatism, the sixth lens element 16 can increase an amount of light passing through a system and correct a system field curvature, and the seventh lens element 17 can also increase the amount of light passing through the system and correct distortion. It should be noted that only functions implemented by the lens elements in this embodiment are provided herein. In other embodiments of this application, lens elements can implement other functions. The functions are not limited herein.

It should be noted that only functions implemented by the lens elements in this embodiment are provided herein. In other embodiments of this application, lens elements can implement other functions. The functions are not limited herein.

Figure 13:
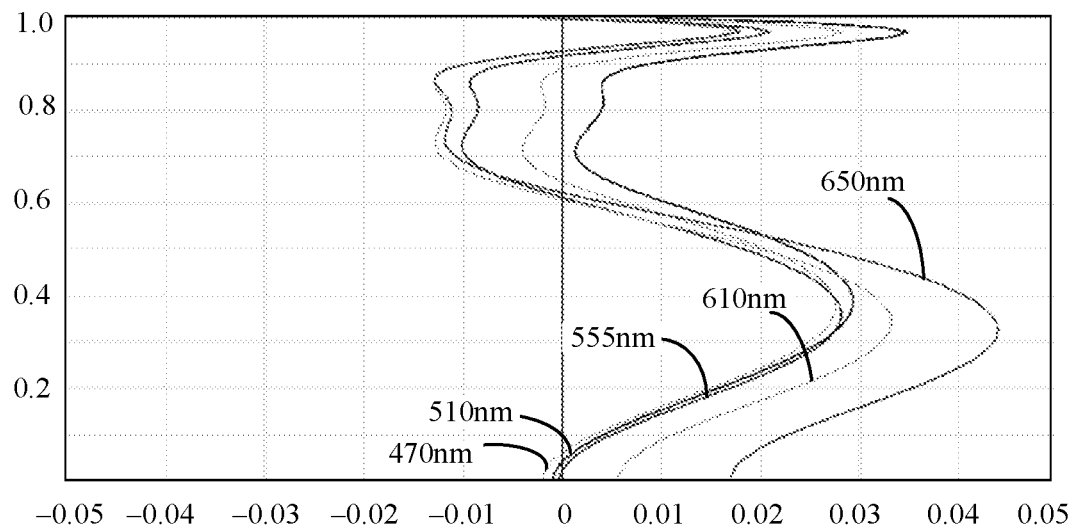
FIG. 13 is a schematic diagram of axial chromatic aberration of the optical lens according to the third embodiment of this application.
Figure 14:
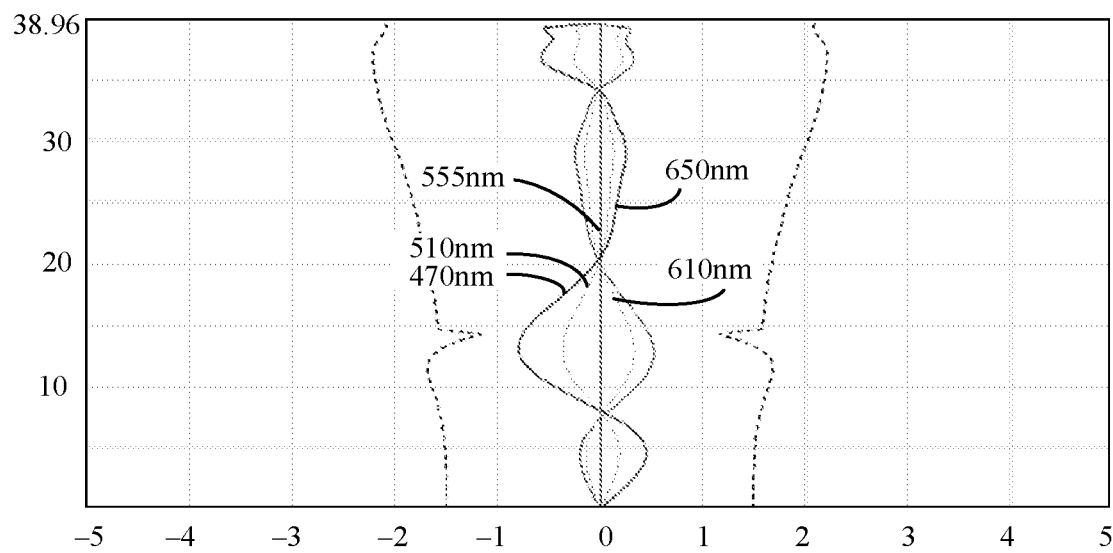
FIG. 14 is a schematic diagram of lateral chromatic aberration of the optical lens according to the third embodiment of this application.
Figure 15:
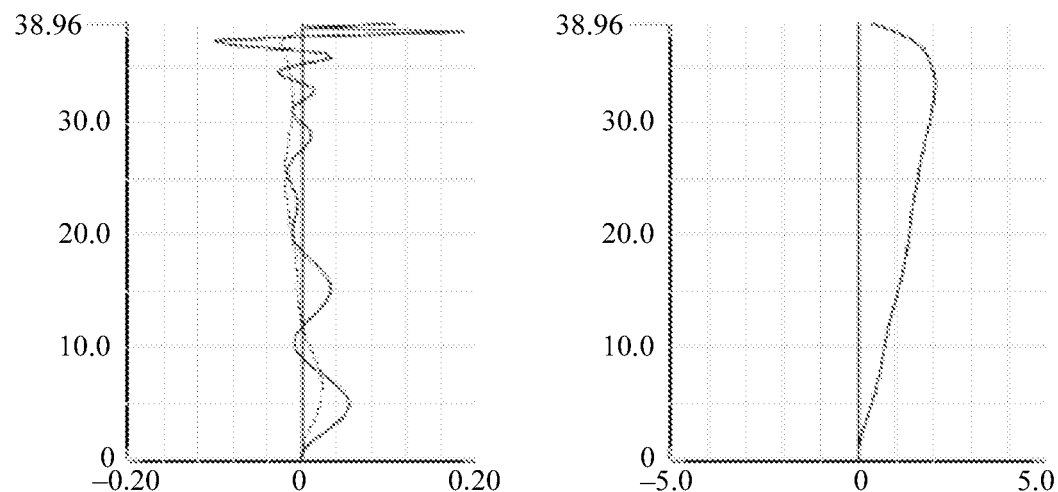
FIG. 15 is a schematic diagram of a field curvature and optical distortion of the optical lens according to the third embodiment of this application.

FIG. 13 to FIG. 15 are diagrams for characterization of optical performance of the optical lens 10 in the third embodiment.

Specifically, FIG. 13 shows axial aberration after light of wavelengths 650 nm, 610 nm, 555 nm, 510 nm, and 470 nm respectively passes through the optical lens 10 in the third embodiment. In FIG. 13, a vertical coordinate represents a normalized pupil coordinate, and a horizontal coordinate represents axial aberration, in units of milliseconds. As can be seen from FIG. 13, the axial aberration in this embodiment is controlled within a small range.

FIG. 14 shows lateral color after light of wavelengths 650 nm, 610 nm, 555 nm, 510 nm, and 470 nm respectively passes through the optical lens 10 in the third embodiment. In FIG. 14, a vertical coordinate represents a field of view, in units of degrees (°), and a horizontal coordinate represents a diffraction limit range, in units of microns (μm). A dashed line in FIG. 14 represents a diffraction limit range of the optical lens 10. As can be learned from the figure, all lateral color after light of each wavelength passes through the optical lens 10 in the third embodiment is within the diffraction limit, that is, the lateral color after the light of each wavelength passes through the optical lens 10 in the third embodiment basically does not affect imaging quality of the optical lens 10.

FIG. 15 shows a schematic diagram of a field curvature and optical distortion after light of the wavelength 555 nm passes through the optical lens 10 in the third embodiment, used to indicate a difference between imaging deformation and an ideal shape after the light passes through the optical lens 10. In a left drawing in FIG. 15, a solid line is a schematic diagram of a field curvature in a meridian direction after the light of the wavelength 555 nm passes through the optical lens 10; and a dashed line is a schematic diagram of a field curvature in a sagittal direction after the light of the wavelength 555 nm passes through the optical lens 10. A right drawing in FIG. 15 is a schematic diagram of optical distortion after the light of the wavelength 555 nm passes through the optical lens 10 in the third embodiment. As can be seen from the figure, in this embodiment, the optical system controls distortion within a range recognizable by unaided eyes (2% and below unrecognizable by unaided eyes).

A back focal length BFL of the optical lens 10 provided in this embodiment is 4.173 mm, and a total track length TTL is 11.141 mm. In this case, a length of a TTL1 is 6.968 mm. In this case, a thickness of a terminal 1000 may be about 6.968 mm, so that the terminal 1000 has a small thickness while having good imaging quality.

Figure 16:
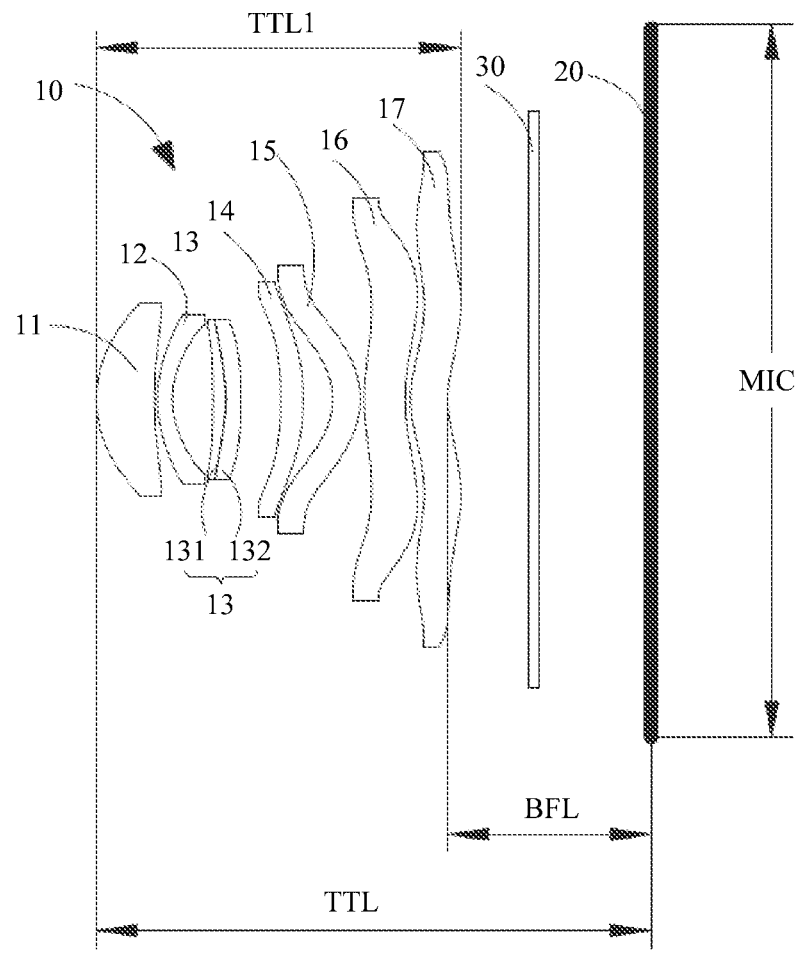
FIG. 16 is a partial schematic structural diagram of an optical lens according to a fourth embodiment of this application.

FIG. 16 shows an optical lens 10 according to a fourth embodiment of this application. In this embodiment, the optical lens 10 includes seven lens elements, which are respectively a first lens element 11, a second lens element 12, a third lens element 13, a fourth lens element 14, a fifth lens element 15, a sixth lens element 16, and a seventh lens element 17. The first lens element 11, the second lens element 12, the third lens element 13, the fourth lens element 14, the fifth lens element 15, the sixth lens element 16, and the seventh lens element 17 are disposed in sequence from an object side to an image side, and the lens elements are coaxially disposed. The third lens element 13 includes two sub lens elements that fit into each other, where the two sub lens elements that fit into each other are a first sub lens element 131 and a second sub lens element 132 respectively, the first sub lens element 131 is made of a plastic material, and the second sub lens element 132 is made of a glass material. In this embodiment, the first lens element 11, the second lens element 12, the fourth lens element 14, the fifth lens element 15, the sixth lens element 16, and the seventh lens element 17 are all made of plastic materials.

The first lens element 11 has positive refractive power, an object-side surface of the first lens element 11 near an axis is convex, and an image-side surface of the first lens element 11 near the axis is concave. The second lens element 12 has negative refractive power, an object-side surface of the second lens element 12 near the axis is convex, and an image-side surface of the second lens element 12 near the axis is concave. The third lens element 13 has positive refractive power, an object-side surface of the third lens element 13 near the axis is concave, and an image-side surface of the third lens element 13 near the axis is convex. The fourth lens element 14 has positive refractive power. The fifth lens element 15 has negative refractive power. The sixth lens element 16 has positive refractive power, an object-side surface of the sixth lens element 16 near the axis is convex, and an image-side surface of the sixth lens element 16 near the axis is concave. The seventh lens element 17 has positive refractive power, an object-side surface of the seventh lens element 17 near the axis is convex, and an image-side surface of the seventh lens element 17 near the axis is concave.

Based on the foregoing relations, design parameters of the optical lens 10 in the fourth embodiment of this application are shown in the following Table 7. For meanings of the parameters, refer to related descriptions in the first embodiment.

TABLE 7

Design parameters of the optical lens in the fourth embodiment

| BFL | 4.288 | BFL/TTL | 0.379 | TTL1/MIC | 0.443 |
|---|---|---|---|---|---|
| n1 | 1.54 | $R_1/R_2$ | 0.253 | $R_3/R_4$ | 1.376 |
| v1-v2 | 36.8 | $f_1/f$ | 0.765 | $f_2/f$ | -1.512 |
| v1-v31 | 6.4 | $R_{51}/R_6$ | 0.651 | $R_{11}/R_{12}$ | 1.05 |
| v1-v32 | 0 | $f_3/f$ | 5.137 | $f_6/f$ | 1899.724 |
| v1-v4 | 0 | $R_{13}/R_{14}$ | 0.885 | $f_7/f$ | 2.921 |
| d1/(d1 + d2 + d3 + d4 + d5 + d6 + d7) | | 0.253 | d2/(d1 + d2 + d3 + d4 + d5 + d6 + d7) | | 0.066 |
| d3/(d1 + d2 + d3 + d4 + d5 + d6 + d7) | | 0.145 | d6/(d1 + d2 + d3 + d4 + d5 + d6 + d7) | | 0.167 |
| d7/(d1 + d2 + d3 + d4 + d5 + d6 + d7) | | 0.149 | | | |

In this embodiment, $R_{51}$ indicates a curvature radius of the object-side surface of the third lens element 13.

Table 8 shows basic parameters of the optical lens 10 in the fourth embodiment of this application.

TABLE 8

Basic parameters of the optical lens in the fourth embodiment

| Focal length f | 9.840 mm |
|---|---|
| Aperture F value | 2.2 |
| Half FOV | 38.6° |
| Total track length TTL | 11.320 mm |
| Design wavelength | 650 nm, 610 nm, 555 nm, 510 nm, and 470 nm |

In this embodiment, the image-side surface and the object-side surface of each lens element of the optical lens 10 are both extended even aspheres. A surface type y of the image-side surface and the object-side surface of the first lens element 11 to a surface type y of the image-side surface and the object-side surface of the seventh lens element 17 may be defined, without limitation, by using the following aspherical formula:

$$y = \frac{cr^2}{1 + \sqrt{1 - (1+K)c^2r^2}} + \sum_{i=1}^{N} a_i \rho^i$$

where y is an aspherical sagitta, r is an aspherical radial coordinate, c is a spherical curvature of an aspherical vertex, K is a quadratic surface constant, $a_i$ is an aspherical coefficient, and $\rho$ is a normalized axial coordinate.

In this embodiment, different lens elements of the optical lens 10 obtained by using the design parameters above can implement different functions respectively, so that the optical lens 10 having good imaging quality is obtained through cooperation of the lens elements. Specifically, in this embodiment, the first lens element 11 can effectively reduce system aberration, the second lens element 12 can effectively correct system spherical aberration, the third lens element 13 can effectively correct system astigmatism, the fourth lens element 14 can effectively correct system spherical aberration, the fifth lens element 15 can reduce distortion of an edge field of view and correct astigmatism, the sixth lens element 16 can increase an amount of light passing through a system and correct a system field curvature, and the seventh lens element 17 can also increase the amount of light passing through the system and correct distortion. It should be noted that only functions implemented by the lens elements in this embodiment are provided herein. In other embodiments of this application, lens elements can implement other functions. The functions are not limited herein.

It should be noted that only functions implemented by the lens elements in this embodiment are provided herein. In other embodiments of this application, lens elements can implement other functions. The functions are not limited herein.

Figure 17:
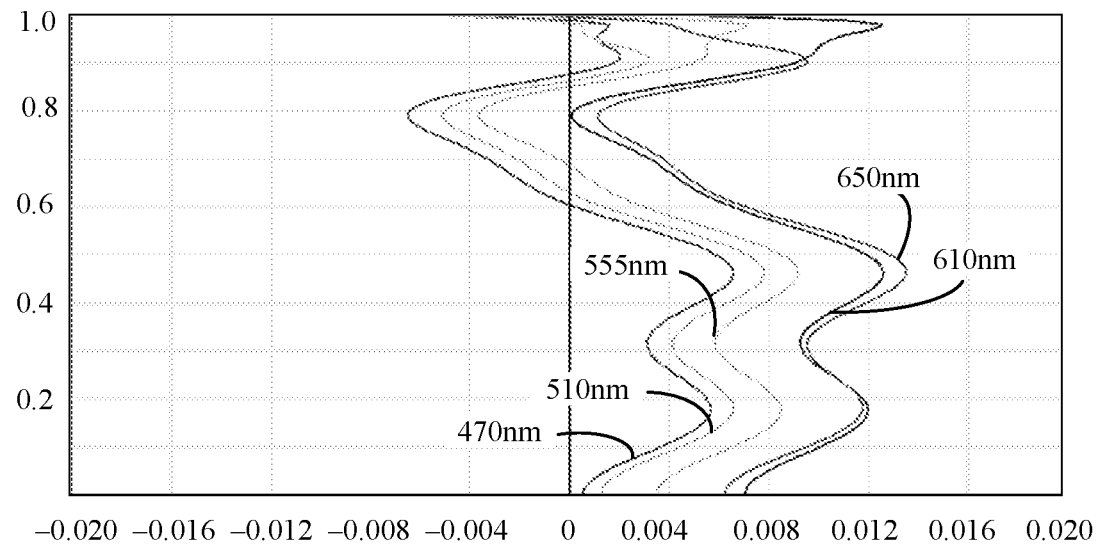
FIG. 17 is a schematic diagram of axial chromatic aberration of the optical lens according to the fourth embodiment of this application.
Figure 18:
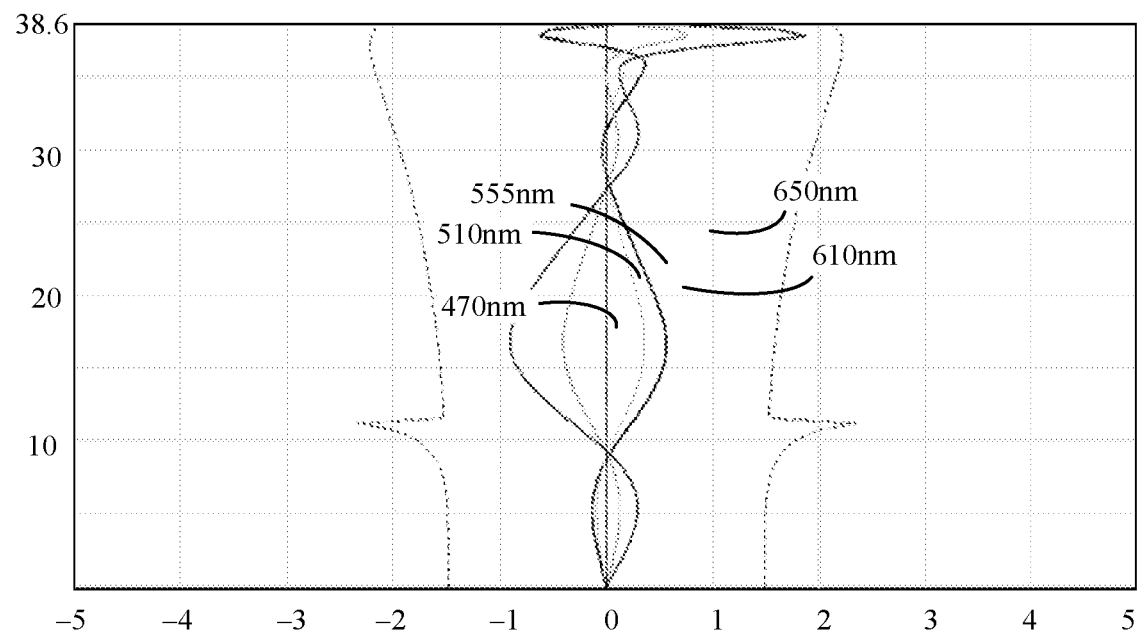
FIG. 18 is a schematic diagram of lateral chromatic aberration of the optical lens according to the fourth embodiment of this application.
Figure 19:
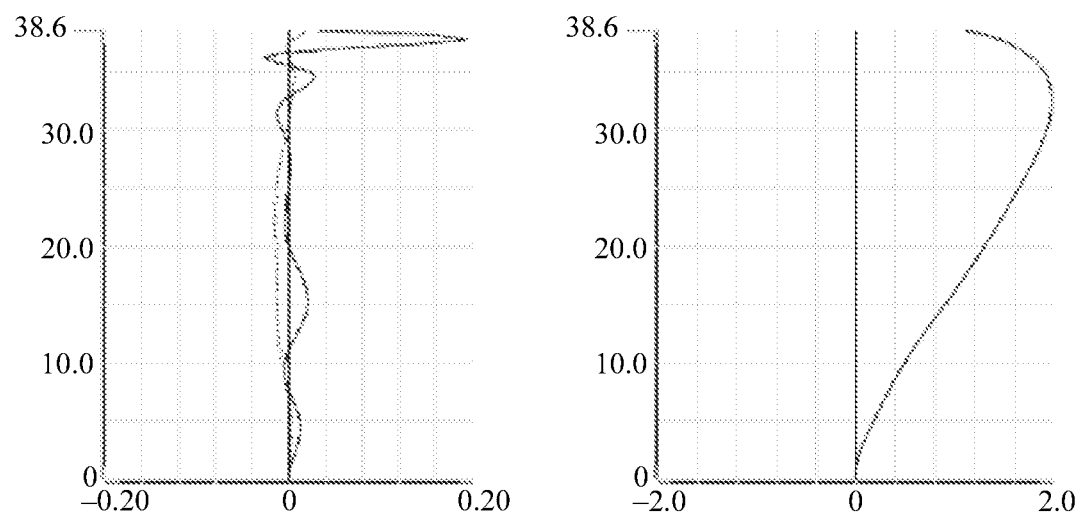
FIG. 19 is a schematic diagram of a field curvature and optical distortion of the optical lens according to the fourth embodiment of this application.

FIG. 17 to FIG. 19 are diagrams for characterization of optical performance of the optical lens 10 in the fourth embodiment.

Specifically, FIG. 17 shows axial aberration after light of wavelengths 650 nm, 610 nm, 555 nm, 510 nm, and 470 nm respectively passes through the optical lens 10 in the fourth embodiment. In FIG. 17, a vertical coordinate represents a normalized pupil coordinate, and a horizontal coordinate represents axial aberration, in units of milliseconds. As can be seen from FIG. 17, the axial aberration in this embodiment is controlled within a small range.

FIG. 18 shows lateral color after light of wavelengths 650 nm, 610 nm, 555 nm, 510 nm, and 470 nm respectively passes through the optical lens 10 in the fourth embodiment. In FIG. 18, a vertical coordinate represents a field of view, in units of degrees (°), and a horizontal coordinate represents a diffraction limit range, in units of microns (µm). A dashed line in FIG. 18 represents a diffraction limit range of the optical lens 10. As can be learned from the figure, all lateral color after light of each wavelength passes through the optical lens 10 in the fourth embodiment is within the diffraction limit, that is, the lateral color after the light of each wavelength passes through the optical lens 10 in the fourth embodiment basically does not affect imaging quality of the optical lens 10.

FIG. 19 shows a schematic diagram of a field curvature and optical distortion after light of the wavelength 555 nm passes through the optical lens 10 in the fourth embodiment, used to indicate a difference between imaging deformation and an ideal shape after the light passes through the optical lens 10. In a left drawing in FIG. 19, a solid line is a schematic diagram of a field curvature in a meridian direction after the light of the wavelength 555 nm passes through the optical lens 10; and a dashed line is a schematic diagram of a field curvature in a sagittal direction after the light of the wavelength 555 nm passes through the optical lens 10. A right drawing in FIG. 19 is a schematic diagram of optical distortion after the light of the wavelength 555 nm passes through the optical lens 10 in the fourth embodiment. As can be seen from the figure, in this embodiment, the optical system controls distortion within a range recognizable by unaided eyes (2% and below unrecognizable by unaided eyes).

A back focal length BFL of the optical lens 10 provided in this embodiment is 4.288 mm, and a total track length TTL is 11.32 mm. In this case, a length of a TTL1 is 7.032 mm. In this case, a thickness of a terminal 1000 may be about 7.032 mm, so that the terminal 1000 has a small thickness while having good imaging quality.

Figure 20:
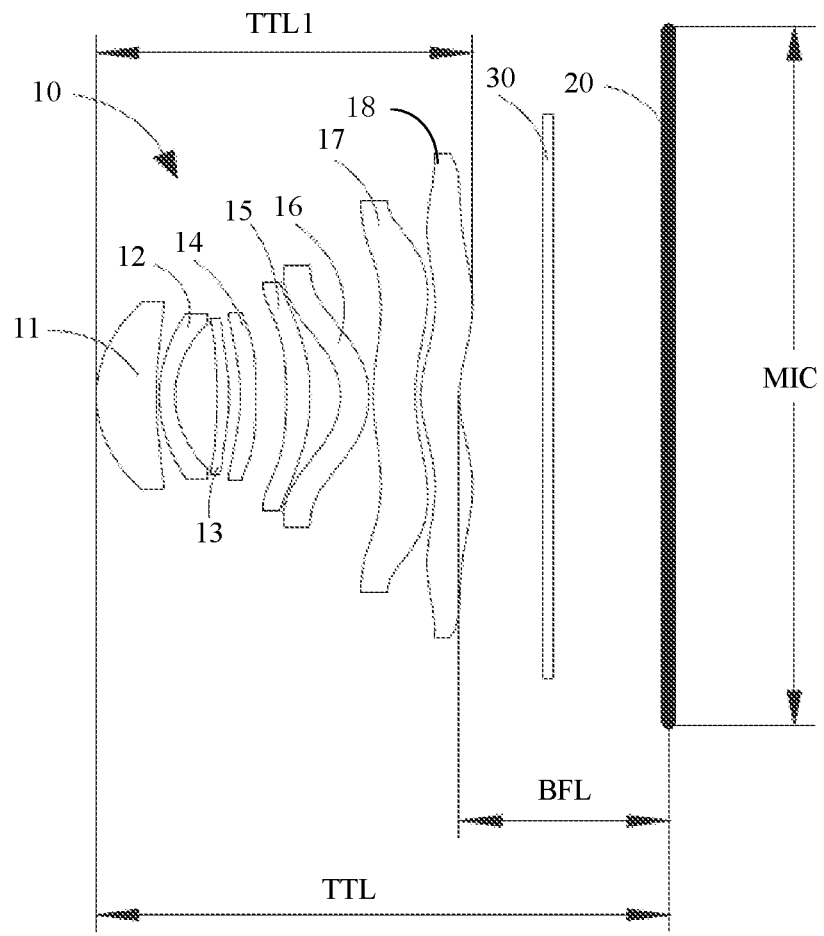
FIG. 20 is a partial schematic structural diagram of an optical lens according to a fifth embodiment of this application.

FIG. 20 is a schematic structural diagram of an optical lens 10 according to a fifth embodiment of this application. In this embodiment, the optical lens 10 includes eight lens elements, which are respectively a first lens element 11, a second lens element 12, a third lens element 13, a fourth lens element 14, a fifth lens element 15, a sixth lens element 16, a seventh lens element 17, and an eighth lens element 18. The first lens element 11, the second lens element 12, the third lens element 13, the fourth lens element 14, the fifth lens element 15, the sixth lens element 16, the seventh lens element 17, and the eighth lens element are disposed in sequence from an object side to an image side, and the lens elements are coaxially disposed. In this embodiment, the first lens element 11, the second lens element 12, the fourth lens element 14, the fifth lens element 15, the sixth lens element 16, the seventh lens element 17, and the eighth lens element 18 are all made of plastic materials.

The first lens element 11 has positive refractive power, an object-side surface of the first lens element 11 near an axis is convex, and an image-side surface of the first lens element 11 near the axis is concave. The second lens element 12 has negative refractive power, an object-side surface of the second lens element 12 near the axis is convex, and an image-side surface of the second lens element 12 near the axis is concave. The third lens element 13 has positive refractive power, an object-side surface of the third lens element 13 near the axis is concave, and an image-side surface of the third lens element 13 near the axis is convex. The fourth lens element 14 has negative refractive power. The fifth lens element 15 has positive refractive power. The sixth lens element 16 has negative refractive power. The seventh lens element 17 has positive refractive power, an object-side surface of the seventh lens element 17 near the axis is convex, and an image-side surface of the seventh lens element 17 near the axis is convex. The eighth lens element 18 has positive refractive power, an object-side surface of the eighth lens element 18 near the axis is convex, and an image-side surface of the eighth lens element 18 near the axis is convex.

Based on the foregoing relations, design parameters of the optical lens 10 in the fifth embodiment of this application are shown in the following Table 9. For meanings of the parameters, refer to related descriptions in the first embodiment.

TABLE 9

Design parameters of the optical lens in the fifth embodiment

| | | | | | |
|---|---|---|---|---|---|
| BFL | 4.054 | BFL/EFL | 0.425 | TTL1/TTL | 0.864 |
| n1 | 1.54 | $R_1/R_2$ | 0.261 | $R_3/R_4$ | 1.380 |
| v1-v2 | 36.8 | $f_1/f$ | 0.794 | $f_2/f$ | −1.550 |
| v1-v3 | 6.4 | $R_5/R_6$ | 3.523 | $R_{11}/R_{12}$ | 1.05 |
| v1-v4 | 0 | $f_3/f$ | 1.153 | $f_6/f$ | 1899.72 |
| | | $R_{13}/R_{14}$ | 1.04 | $R_{15}/R_{16}$ | 0.882 |
| | | $f_7/f$ | 84.927 | $f_8/f$ | 2.852 |
| d1/(d1 + d2 + d3 + d4 + d5 + d6 + d7 + d8) | 0.491 | d2/(d1 + d2 + d3 + d4 + d5 + d6 + d7 + d8) | 0.067 | | |
| d3/(d1 + d2 + d3 + d4 + d5 + d6 + d7 + d8) | 0.051 | d6/(d1 + d2 + d3 + d4 + d5 + d6 + d7 + d8) | 0.167 | | |
| d7/(d1 + d2 + d3 + d4 + d5 + d6 + d7 + d8) | 0.149 | d8/(d1 + d2 + d3 + d4 + d5 + d6 + d7 + d8) | 0.163 | | |

In this embodiment, d8 indicates a thickness of the eighth lens element 18, $R_{15}$ indicates a curvature radius of the object-side surface of the eighth lens element 18, and $R_{16}$ indicates a curvature radius of the image-side surface of the eighth lens element 18.

Table 10 shows basic parameters of the optical lens 10 in the fifth embodiment of this application.

TABLE 10

Basic parameters of the optical lens in the fifth embodiment

| | |
|---|---|
| Focal length f | 9.538 mm |
| Aperture F value | 2.1 |
| Half FOV | 38.6° |
| Total track length TTL | 11.043 mm |
| Design wavelength | 650 nm, 610 nm, 555 nm, 510 nm, and 470 nm |

In this embodiment, the image-side surface and the object-side surface of each lens element of the optical lens 10 are both extended even aspheres. A surface type y of the image-side surface and the object-side surface of the first lens element 11 to a surface type y of the image-side surface and the object-side surface of the eighth lens element 18 may be defined, without limitation, by using the following aspherical formula:

$$y = \frac{cr^2}{1 + \sqrt{1 - (1+K)c^2r^2}} + \sum_{i=1}^{N} a_i \rho^i$$

where y is an aspherical sagitta, r is an aspherical radial coordinate, c is a spherical curvature of an aspherical vertex, K is a quadratic surface constant, $a_i$ is an aspherical coefficient, and ρ is a normalized axial coordinate.

In this embodiment, different lens elements of the optical lens 10 obtained by using the design parameters above can implement different functions respectively, so that the optical lens 10 having good imaging quality is obtained through cooperation of the lens elements. Specifically, in this embodiment, the first lens element 11 can effectively reduce system aberration, the second lens element 12 can effectively correct system spherical aberration, the third lens element 13 can effectively correct system astigmatism, the fourth lens element 14 can effectively correct system spherical aberration, the fifth lens element 15 can reduce distortion of an edge field of view and correct astigmatism, the sixth lens element 16 can increase an amount of light passing through a system and correct a system field curvature, and the seventh lens element 17 can also increase the amount of light passing through the system and correct distortion. It should be noted that only functions implemented by the lens elements in this embodiment are provided herein. In other embodiments of this application, lens elements can implement other functions. The functions are not limited herein. It should be noted that only functions implemented by the lens elements in this embodiment are provided herein. In other embodiments of this application, lens elements can implement other functions. The functions are not limited herein.

Figure 21:
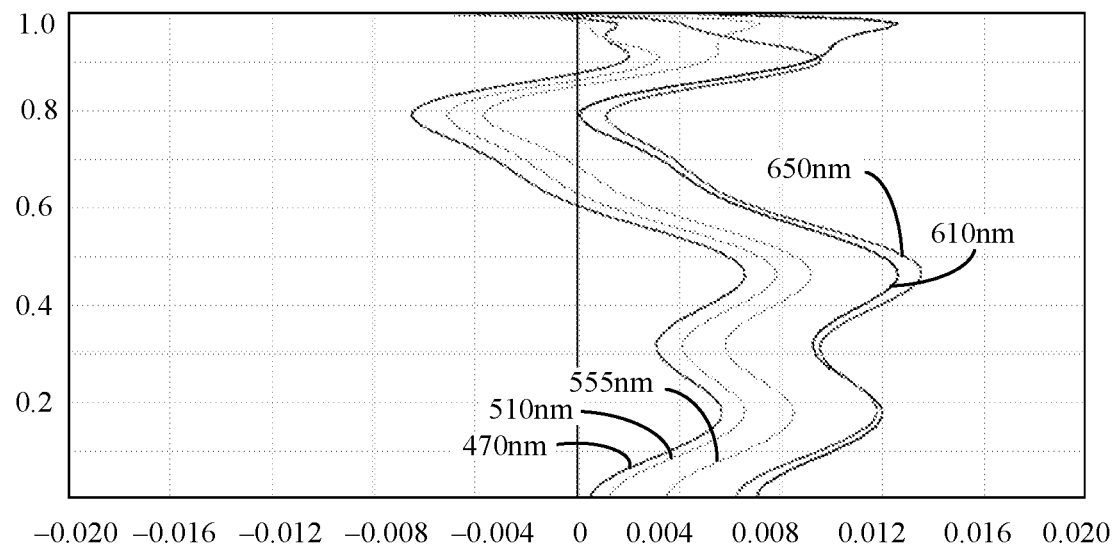
FIG. 21 is a schematic diagram of axial chromatic aberration of the optical lens according to the fifth embodiment of this application.
Figure 22:
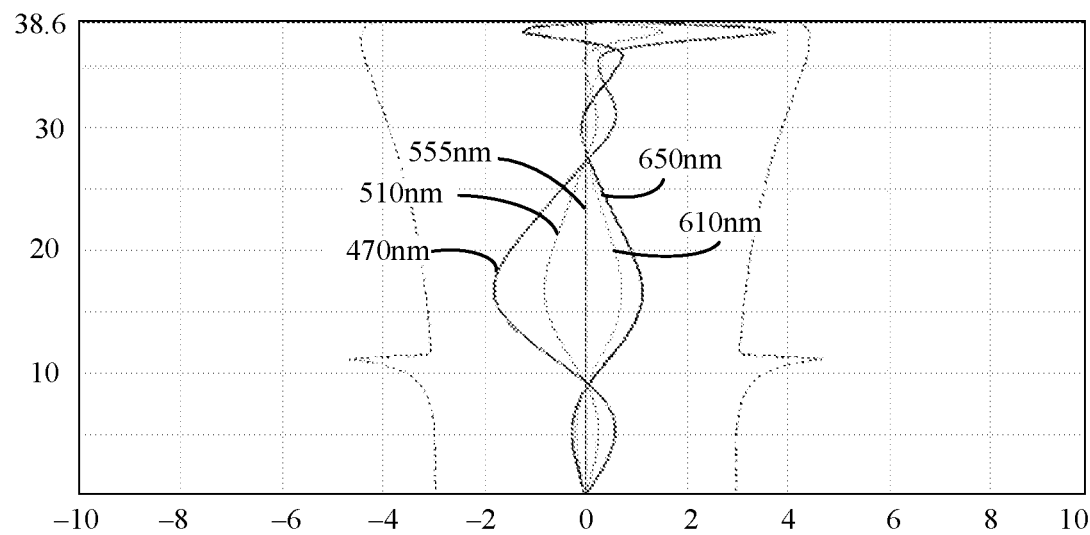
FIG. 22 is a schematic diagram of lateral chromatic aberration of the optical lens according to the fifth embodiment of this application.
Figure 23:
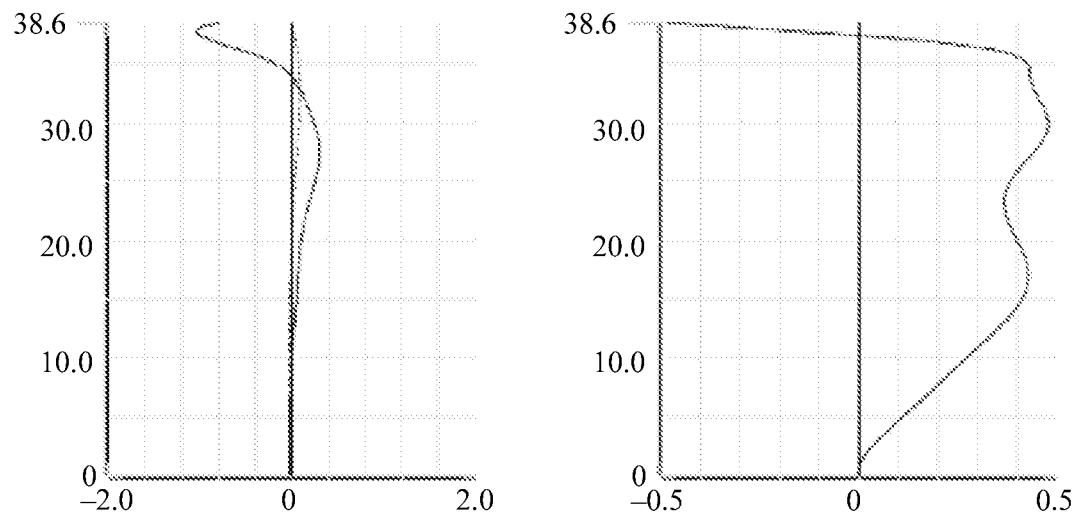
FIG. 23 is a schematic diagram of a field curvature and optical distortion of the optical lens according to the fifth embodiment of this application.

FIG. 21 to FIG. 23 are diagrams for characterization of optical performance of the optical lens 10 in the fifth embodiment.

Specifically, FIG. 21 shows axial aberration after light of wavelengths 650 nm, 610 nm, 555 nm, 510 nm, and 470 nm respectively passes through the optical lens 10 in the fifth embodiment. In FIG. 21, a vertical coordinate represents a normalized pupil coordinate, and a horizontal coordinate represents axial aberration, in units of milliseconds. As can be seen from FIG. 21, the axial aberration in this embodiment is controlled within a small range.

FIG. 22 shows lateral color after light of wavelengths 650 nm, 610 nm, 555 nm, 510 nm, and 470 nm respectively passes through the optical lens 10 in the fifth embodiment. In FIG. 22, a vertical coordinate represents a field of view, in units of degrees (°), and a horizontal coordinate represents a diffraction limit range, in units of microns (μm). A dashed line in FIG. 22 represents a diffraction limit range of the optical lens 10. As can be learned from the figure, all lateral color after light of each wavelength passes through the optical lens 10 in the fifth embodiment is within the diffraction limit, that is, the lateral color after the light of each wavelength passes through the optical lens 10 in the fifth embodiment basically does not affect imaging quality of the optical lens 10.

FIG. 23 shows a schematic diagram of a field curvature and optical distortion after light of the wavelength 555 nm passes through the optical lens 10 in the fifth embodiment, used to indicate a difference between imaging deformation and an ideal shape after the light passes through the optical lens 10. In a left drawing in FIG. 23, a solid line is a schematic diagram of a field curvature in a meridian direction after the light of the wavelength 555 nm passes through the optical lens 10; and a dashed line is a schematic diagram of a field curvature in a sagittal direction after the light of the wavelength 555 nm passes through the optical lens 10. A right drawing in FIG. 23 is a schematic diagram of optical distortion after the light of the wavelength 555 nm passes through the optical lens 10 in the fifth embodiment. As can be seen from the figure, in this embodiment, the optical system controls distortion within a range recognizable by unaided eyes (2% and below unrecognizable by unaided eyes).

A back focal length BFL of the optical lens 10 provided in this embodiment is 4.054 mm, and a total track length TTL is 11.043 mm. In this case, a length of a TTL1 is 6.989 mm. In this case, a thickness of a terminal 1000 may be about 6.989 mm, so that the terminal 1000 has a small thickness while having good imaging quality.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An optical lens, comprising a plurality of lens elements arranged from an object side to an image side, wherein each lens element comprises an object-side surface facing the object side and an image-side surface facing the image side, and the optical lens satisfies the following relations:

$0.2 \le BFL/TTL \le 0.6$, and $0.2 \le TTL1/MIC \le 0.5$, wherein BFL is a back focal length of the optical lens that satisfies 2.55 mm≤BFL≤4.17 mm, TTL is a total track length of the optical lens, TTL1 is a total on-axis thickness of the plurality of lens elements, wherein the total on-axis thickness is calculated as a sum of on-axis thicknesses of air spaces between the plurality of lens elements and on-axis thicknesses of the plurality of lens elements, and MIC is a maximum image circle diameter of the optical lens.

2. The optical lens according to claim 1, wherein the plurality of lens elements arranged from the object side to the image side comprise a first lens element, a second lens element, a third lens element, a fourth lens element, and a fifth lens element arranged in sequence.

3. The optical lens according to claim 2, wherein the following relations are satisfied between the first lens element and the second lens element, and between the first lens element and the fifth lens element:

$20 \le v1 - v2 \le 60$, and $-16 \le v1 - v5 \le 60$, wherein v1 is an Abbe number of the first lens element, v2 is an Abbe number of the second lens element, and v5 is an Abbe number of the fifth lens element.

4. The optical lens according to claim 2, wherein the first lens element has positive refractive power, an object-side surface of the first lens element near an axis is convex, an image-side surface of the first lens element near the axis is convex or concave, and the first lens element satisfies the following relations:

$$0.5 \le f_1/f \le 0.8, \text{ and}$$
$$-0.024 \le R_1/R_2 < 0 \text{ or } 0 < R_1/R_2 \le 0.404,$$

wherein $f_1$ is a focal length of the first lens element, f is a focal length of the optical lens, $R_1$ is a curvature radius of the object-side surface of the first lens element, and $R_2$ is a curvature radius of the image-side surface of the first lens element.

5. The optical lens according to claim 2, wherein the first lens element satisfies the following relation:

$$0.2 \le d1/\sum d \le 0.3,$$

wherein d1 is an on-axis thickness of the first lens element, and Σd is a sum of on-axis thicknesses of all of the plurality of lens elements.

6. The optical lens according to claim 2, wherein the second lens element has negative refractive power, a part of an object-side surface of the second lens element near an axis is convex, an image-side surface of the second lens element near the axis is concave, and the following relations are satisfied:

$$-2.1 \le f_2/f \le -1.0, \text{ and}$$
$$1 \le R_3/R_4 \le 24,$$

wherein $f_2$ is a focal length of the second lens element, f is the focal length of the optical lens, $R_3$ is a curvature radius of the object-side surface of the second lens element, and $R_4$ is a curvature radius of the image-side surface of the second lens element.

7. The optical lens according to claim 2, wherein the second lens element satisfies the following relation:

$$0.06 \le d2/\sum d \le 0.09,$$

wherein d2 is an on-axis thickness of the second lens element, and Σd is the sum of the on-axis thicknesses of all of the plurality of lens elements.

8. The optical lens according to claim 2, wherein the third lens element has positive refractive power or negative refractive power, an object-side surface and an image-side surface of the third lens element near the axis are both convex or concave, and the following relations are satisfied:

$$-80 \le f_3/f \le 1.2, \text{ and}$$
$$0.6 \le R_5/R_6 \le 3.6,$$

wherein $f_3$ is a focal length of the third lens element, f is the focal length of the optical lens, $R_5$ is a curvature radius of the object-side surface of the third lens element, and $R_6$ is a curvature radius of the image-side surface of the third lens element.

9. The optical lens according to claim 2, wherein the third lens element satisfies the following relation:

$$0.05 \le d3/\sum d \le 0.2,$$

wherein d3 is an on-axis thickness of the third lens element, and Σd is the sum of the on-axis thicknesses of all of the plurality of lens elements.

10. The optical lens according to claim 1, wherein the lens element closest to the image side has positive refractive power or negative refractive power, an object-side surface of the lens element near the axis is convex or concave, an image-side surface of the lens element near the axis is concave, and the lens element closest to the image side satisfies the following relations:

$$-1 \le f_n/f \le 4, \text{ and}$$
$$0.82 \le R_{2n-1}/R_{2n} \le 3.29,$$

wherein a quantity of the plurality of lens elements is n, n being an integer greater than or equal to 6, $f_n$ is a focal length of the lens element closest to the image side, f is the focal length of the optical lens, $R_{2n-1}$ is a curvature radius of the object-side surface of the lens element closest to the image side, and $R_{2n}$ is a curvature radius of the image-side surface of the lens element closest to the image side.

11. The optical lens according to claim 1, wherein the lens element closest to the image side satisfies the following relation:

$$0.2 \le dn/\sum d \le 0.3.$$

wherein dn is an on-axis thickness of the lens element closest to the image side, and Σd is the sum of the on-axis thicknesses of all of the plurality of lens elements.

12. The optical lens according to claim 2, wherein a refractive index n1 of the first lens element satisfies the following relation:

$$1.50 \le n1 \le 1.90.$$

13. A camera module, comprising a photosensitive element, a driving portion, and an optical lens, the optical lens comprises a plurality of lens elements arranged from an object side to an image side, wherein each lens element comprises an object-side surface facing the object side and an image-side surface facing the image side, and the optical lens satisfies the following relations:

$0.2 \leq BFL/TTL \leq 0.6$, and $0.2 \leq TTL1/MIC \leq 0.5$, wherein BFL is a back focal length of the optical lens that satisfies $2.55 \text{ mm} \leq BFL \leq 4.17 \text{ mm}.$ TTL is a total track length of the optical lens, TTL1 is a total on-axis thickness of the plurality of lens elements, wherein the total on-axis thickness is calculated as a sum of on-axis thicknesses of air spaces between the plurality of lens elements and on-axis thicknesses of the plurality of lens elements, and MIC is a maximum image circle diameter of the optical lens; and wherein the photosensitive element is located on the image side of the optical lens, and the driving portion drives the optical lens to move close to or away from the photosensitive element.

14. The camera module according to claim 13, wherein the plurality of lens elements arranged from the object side to the image side comprise a first lens element, a second lens element, a third lens element, a fourth lens element, and a fifth lens element that are arranged in sequence.

15. The camera module according to claim 14, wherein the following relations are satisfied between the first lens element and the second lens element, and between the first lens element and the fifth lens element:

$20 \leq v1 - v2 \leq 60$, and $-16 \leq v1 - v5 \leq 60$, wherein v1 is an Abbe number of the first lens element, v2 is an Abbe number of the second lens element, and v5 is an Abbe number of the fifth lens element.

16. A terminal, comprising an image processor and a camera module, the camera module comprises a photosensitive element, a driving portion, and an optical lens, the optical lens comprises a plurality of lens elements arranged from an object side to an image side, wherein each lens element comprises an object-side surface facing the object side and an image-side surface facing the image side, and the optical lens satisfies the following relations:

$0.2 \leq BFL/TTL \leq 0.6$, and $0.2 \leq TTL1/MIC \leq 0.5$, wherein BFL is a back focal length of the optical lens that satisfies $2.55 \text{ mm} \leq BFL \leq 4.17 \text{ mm}.$ TTL is a total track length of the optical lens, TTL1 is a total on-axis thickness of the plurality of lens elements, wherein the total on-axis thickness is calculated as a sum of on-axis thicknesses of air spaces between the plurality of lens elements and on-axis thicknesses of the plurality of lens elements, and MIC is a maximum image circle diameter of the optical lens; and wherein the photosensitive element is located on the image side of the optical lens, and the driving portion drives the optical lens to move close to or away from the photosensitive element; and wherein the image processor is communicatively connected to the camera module, the camera module is configured to obtain image data and input the image data to the image processor, and the image processor is configured to process the image data input to the image processor.

17. The terminal according to claim 16, wherein the plurality of lens elements arranged from the object side to the image side comprise a first lens element, a second lens element, a third lens element, a fourth lens element, and a fifth lens element that are arranged in sequence.

18. The terminal according to claim 17, wherein the following relations are satisfied between the first lens element and the second lens element, and between the first lens element and the fifth lens element:

$20 \leq v1 - v2 \leq 60$, and $-16 \leq v1 - v5 \leq 60$, wherein v1 is an Abbe number of the first lens element, v2 is an Abbe number of the second lens element, and v5 is an Abbe number of the fifth lens element.

* * * * *

UNITED STATES PATENT AND TRADEMARK OFFICE
CERTIFICATE OF CORRECTION

Page 1 of 1

PATENT NO. : 12,158,634 B2
APPLICATION NO. : 17/670212
DATED : December 3, 2024
INVENTOR(S) : Yita Chiang et al.

It is certified that error appears in the above-identified patent and that said Letters Patent is hereby corrected as shown below:

In the Claims

In Column 36, In Line 45, In Claim 11, delete "$\leq 0.3.$" and insert -- $\leq 0.3$, --.

In Column 37, In Line 10 (Approx.), In Claim 13, delete "$\leq 4.17$ mm." and insert -- $\leq 4.17$ mm, --.

In Column 38, In Line 10 (Approx.), In Claim 16, delete "2.55 mm: $\leq$ BFL $\leq 4.17$ mm." and insert -- 2.55 mm $\leq$ BFL $\leq 4.17$ mm, --.

Signed and Sealed this
Twenty-fifth Day of March, 2025

Coke Morgan Stewart
*Acting Director of the United States Patent and Trademark Office*